Feb. 14, 1967   C. KLEESATTEL ETAL   3,304,479
DEVICES FOR SENSING AND INDICATING VARIATIONS
IN FREQUENCY AND AMPLITUDE OF ACOUSTICALLY
VIBRATED WORK MEMBERS
Filed June 5, 1963   5 Sheets-Sheet 1
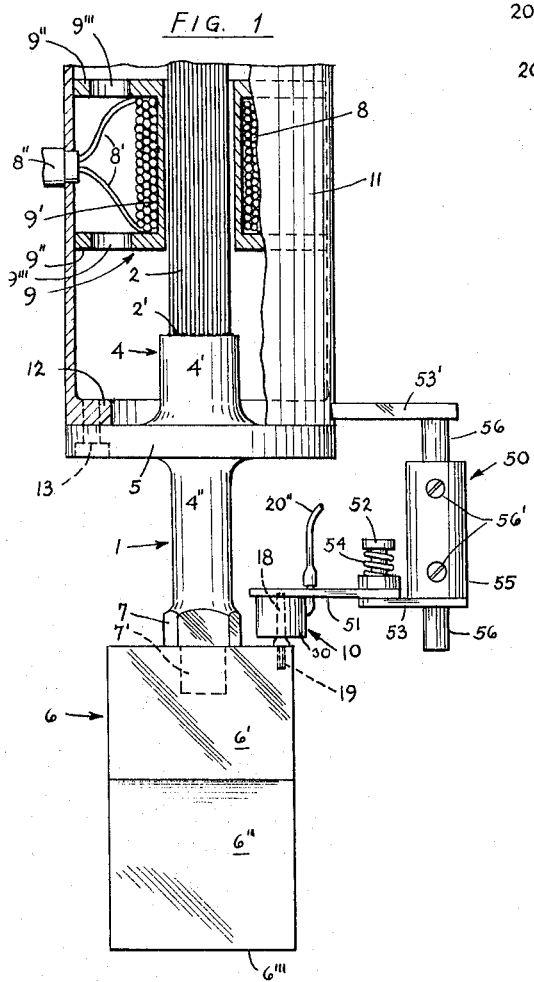
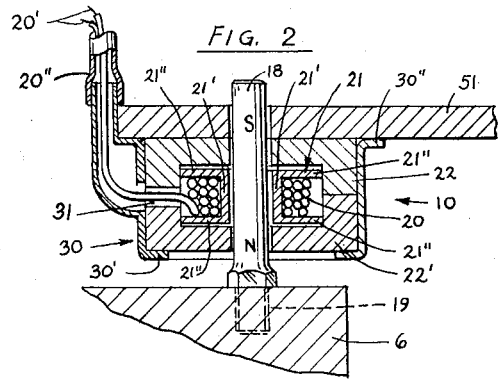
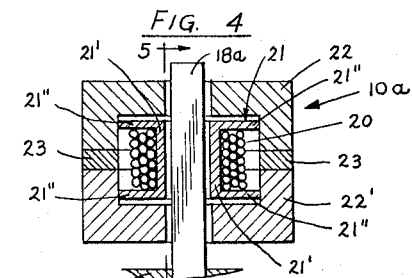
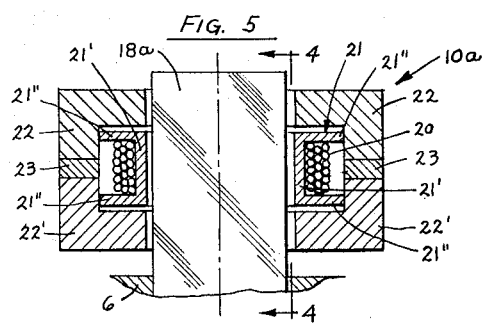
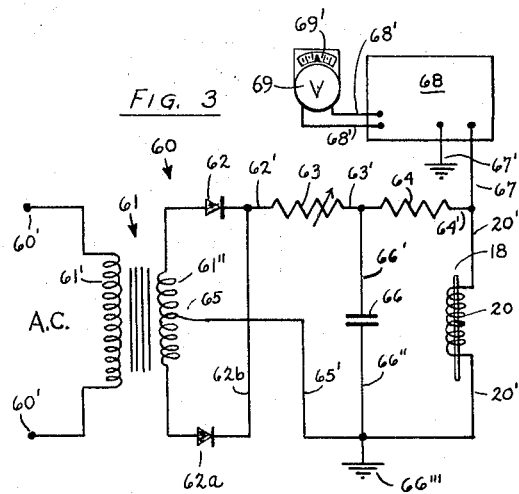
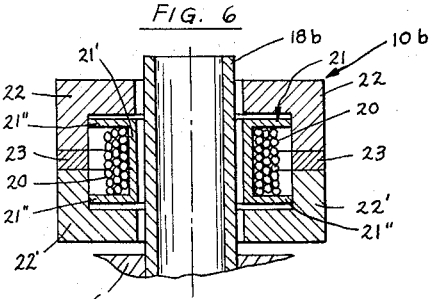
INVENTORS
CLAUS KLEESATTEL
ARTHUR KURIS
LEWIS BALAMUTH
BY
Reuben I. Carlson
Attorney

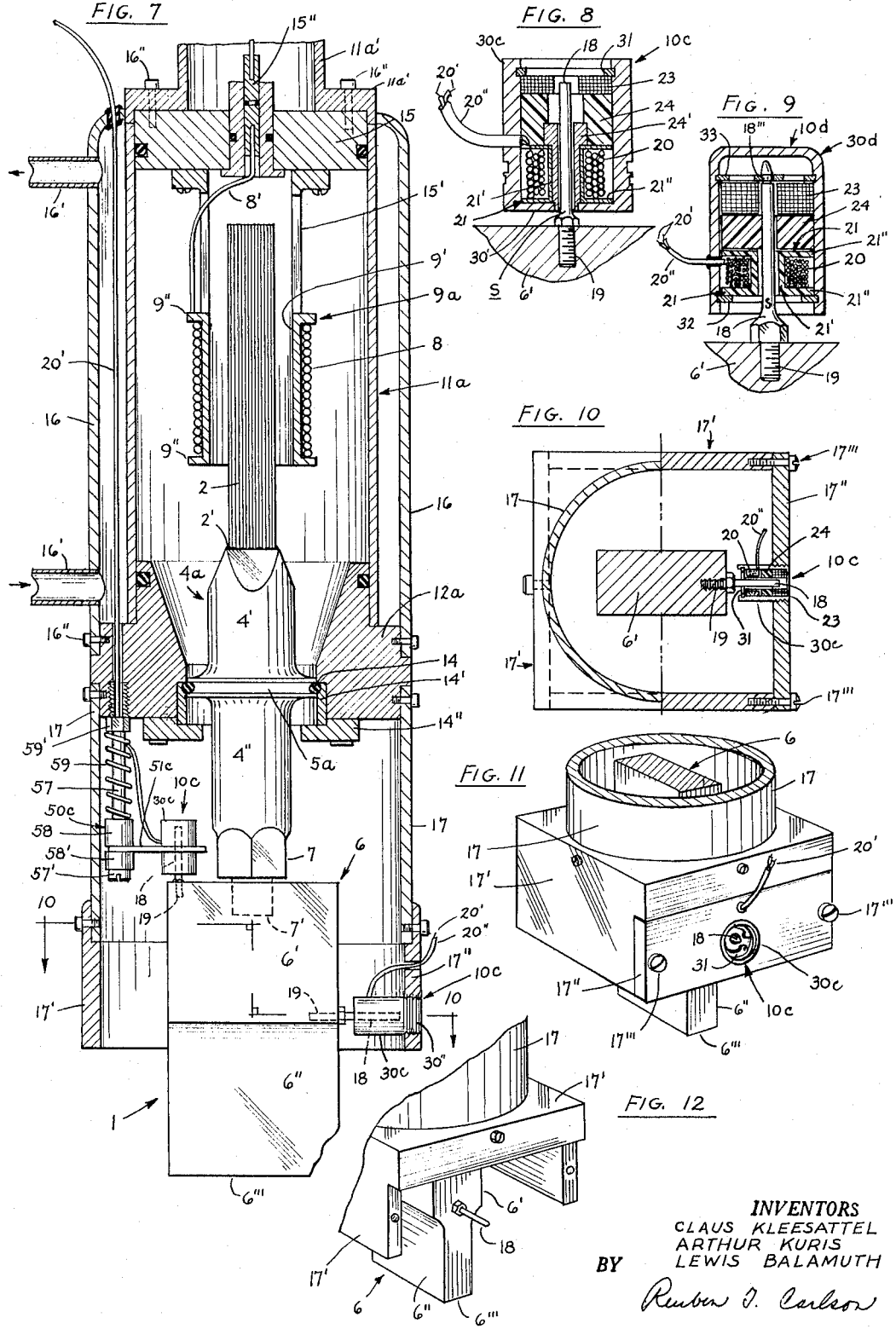

INVENTORS
CLAUS KLEESATTEL
ARTHUR KURIS
LEWIS BALAMUTH

BY Reuben J. Carlson

Attorney

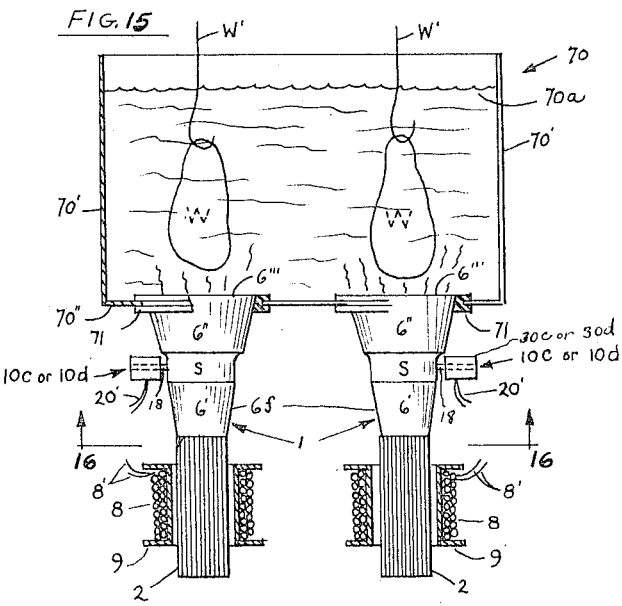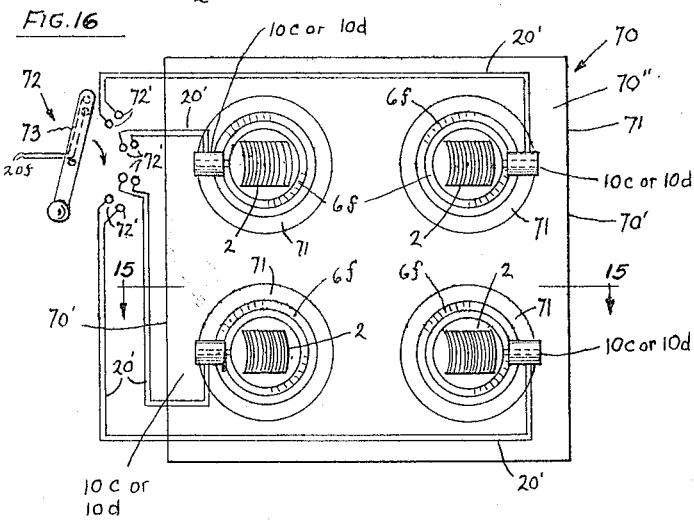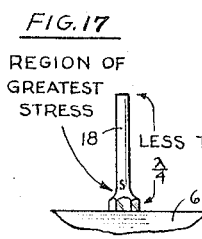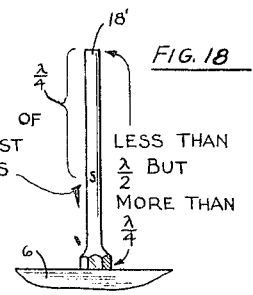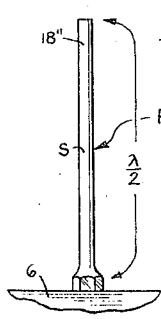

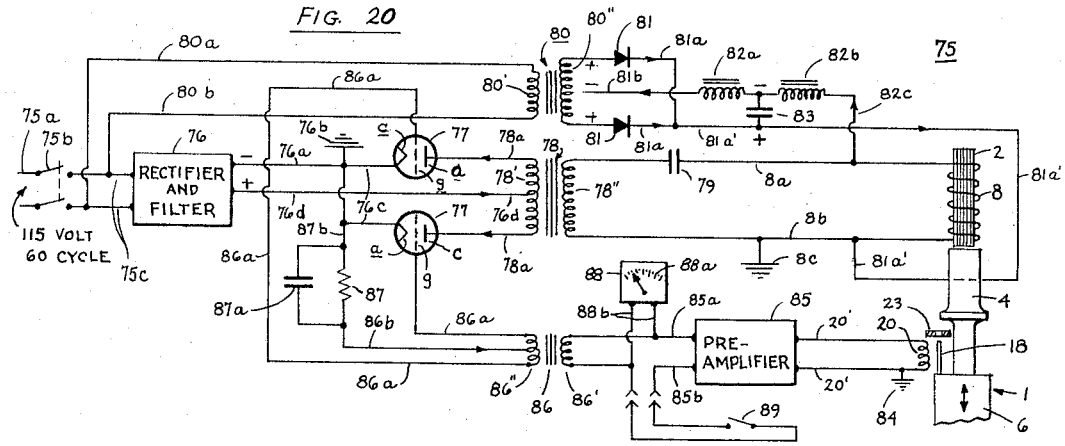
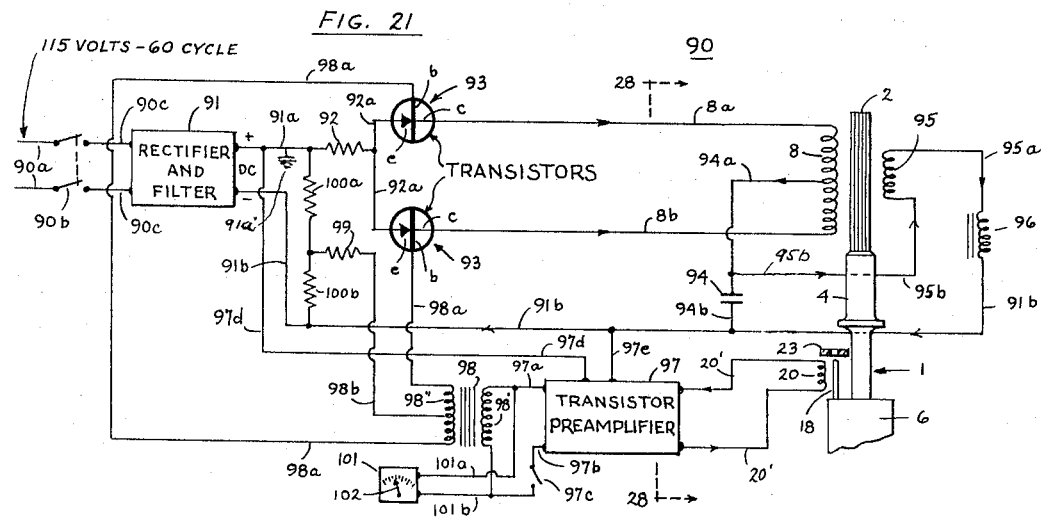
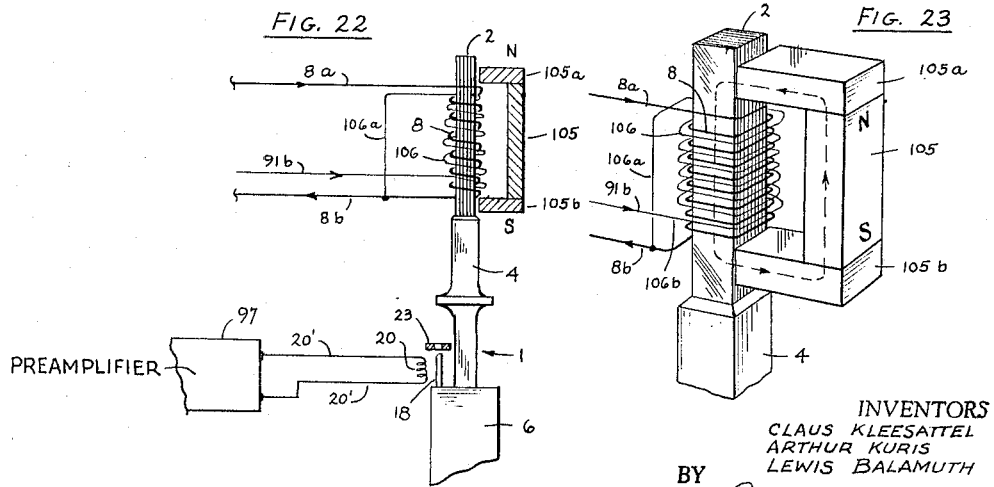

United States Patent Office
3,304,479
Patented Feb. 14, 1967

3,304,479
DEVICES FOR SENSING AND INDICATING VARIATIONS IN FREQUENCY AND AMPLITUDE OF ACOUSTICALLY VIBRATED WORK MEMBERS
Claus Kleesattel, Forest Hills, Arthur Kuris, Riverdale, and Lewis Balamuth, New York, N.Y., assignors to Cavitron Ultrasonics, Inc., Long Island, N.Y., a corporation of New York
Filed June 5, 1963, Ser. No. 285,629
20 Claims. (Cl. 318—118)

This invention relates to devices for sensing and indicating variations in frequency and amplitude of acoustically vibrated work members, and more particularly to a device for sensing any departure from resonance frequency and maximum amplitude of vibration of a component part of a work performing vibrator unit, and which sensing device may be electrically connected to an indicating instrument which indicates to the machine operator the degree or extent which the work-performing vibrator unit has departed from maximum or peak amplitude during the work-performing operation, and which may be used to guide the operator in manually tuning, or connected into a circuit to automatically tune, the biased high frequency alternating current generator which energizes the vibrator unit, to a frequency which matches the resonance frequency of the vibrator unit. This application is a continuation-in-part of our copending application Serial No. 855,932 filed November 27, 1959 and now abandoned.

Sensing and indicating devices made in accordance with this invention are particularly designed for association with a vibration transmitting component of a work-performing vibrator unit. Such vibrator units essentially include a piezoelectric, electromagnetic or magnetostrictive transducer; and preferably a magnetostrictive transducer formed from a plurality of stacked laminates of magnetostrictive metal which is energized to vibrate in the longitudinal mode by a high frequency alternating magnetic field which axially permeates the magnetostrictive laminates, as established by a surrounding energizing coil to which biased high frequency alternating current is supplied by an oscillator or generator having frequency tuning means associated therewith. A vibration transmitting line is fixed to one end of the transducer and transmits the vibrations engendered in the transducer stack to a work element or tool fixed to or forming a part of the terminal end of the transmission line. The transmission line may consist of one or more connecting bodies or tool holders composed of a metal or material having efficient vibration transmitting capabilities. The connecting body and/or tool holder component of the transmission line may be so shaped, formed and designed as to magnify or reduce the amplitude of longitudinal vibration at the terminal or working end of the transmission line to a substantially higher or lower value, than the amplitude of vibration injected into the input end of the transmission line by the energized transducer. The form, shape and design of such amplitude magnifying and amplitude reducing transmission lines is explained in Patent Re. 25,033.

Work-performing vibrator units such as those above explained, are usually designed to operate at maximum amplitude within a relatively narrow frequency band. Since the amount of work which can be performed by a particular vibrator unit is usually dependent upon its vibration velocity, and since its vibration velocity is a factor determined by the frequency of vibration multiplied by the amplitude of vibration, it is apparent that greatest work is performed when the vibrator unit is energized to operate at resonance frequency which yields maximum amplitude.

However, changes in the vibrating frequency of the vibrator unit often occur during operation, which may be above or below true resonance frequency and maximum amplitude of vibration of the vibrator unit and its work tool, and which departures from resonance frequency may be attributed to various causes such as; a drop in frequency of vibration of the vibrator unit caused by an excessive temperature rise in the transducer which may result from improper cooling of the transducer; a change in the tool holder or tool of different form or mass which may result in a change in the resonance frequency of the vibrator unit; changes in electrical output of the generator which may result from excessive heating or instability of a generator component; or changes in the voltage of the line current supplied to the generator.

It is therefore important to provide some means whereby the frequency or amplitude of vibration of the vibrator unit can be continuously sensed during the work-performing operation, and the sensed frequency and/or amplitude translated by an instrument which indicates to the operator the actual amplitude and frequency performance of the vibrator unit or a component part thereof, and so that departures from maximum amplitude and resonance frequency of the vibrator unit can be corrected by automatically or manually tuning the biased high frequency alternating generator, whose output current energizes the transducer section of the vibrator unit, into frequency match with the resonance frequency of the vibrator unit.

Accordingly, it is an object of the present invention to provide an improved device for sensing and indicating variations in frequency or amplitude of a vibration transmission component of a work-performing vibrator unit, and which device is relatively inexpensive to produce and easily calibrated.

Another object of this invention is to provide an improved device for sensing variations in frequency and amplitude of a vibration transmission component of a work-performing vibrator unit which is not subjected to vibration-induced mechanical failures and is trouble free in operation.

Another object of this invention is to provide an improved device for sensing variations in frequency and amplitude of a vibration transmitting component of a work-performing vibrator unit, and which is so made as to impose a minimum loading on the acoustically vibrated work-performing vibrator unit and the vibration transmitting component thereof to which a part of the device is associated, thereby to avoid any appreciable effect on the acoustic properties of such work-performing vibrator unit.

A further object is to provide an improved sensing device which can be made to generate electric signals of relatively large magnitude suitable for the operation of an amplitude indicating meter, generator tuning means or the like.

A still further object is to provide an improved sensing device which can be designed for operation over a relatively wide frequency and amplitude range.

In accordance with this invention, an amplitude sensing device is provided which includes a magnetostrictive member or element, which is connected to or forms a part of a vibration transmitting component of a work-performing vibrator unit, and into which is injected high frequency vibration whose amplitude of vibration is to be sensed. A pickup coil of a pickup assembly extends around the magnetostrictive member or element, and into which an electromotive force is induced in response to alternating stresses produced in the magnetostrictive member or element, as transmitted to the member or element by the vibration transmitting component of the vibrator unit. The magnetostrictive member may be made in the form of a wire, rod, bar or tube of small cross-section fixed at one end thereof to the vibration transmitting component of the vibrator unit in the area of a loop of longitudinal vibration, or a loop of radial vibration, of the vibrator unit component.

Where the magnetostrictive member of the sensing device is in the form of a wire, rod, bar or tube, attached at one end thereof to a vibration transmitting component of the vibrator unit in the area of a loop of vibration thereof, the wire, rod, bar and tube is desirably made of relatively small cross-section and mass as compared to the vibration transmitting component to which the member is attached, in order to minimize loading of the vibration transmitting component of the work-performing vibrator unit. Since the pickup coil, polarizing means and related components of the pickup assembly of the sensing device which surround the magnetostrictive member, can be made of relatively miniature size and compactly assembled, the magnetostrictive member which extends therethrough need not be more than two inches in length and preferably not substantially more than one inch in length or less, as determined by the frequency of vibration.

Sensing devices made in accordance with this invention may be used in association with work-performing vibrator units operating in the frequency range of 5 kc. to 50 kc. or more. Where the vibrator unit is designed to operate at the frequency range of 40 kc. and above, it may be desirable to make the magnetostrictive member of the sensing device one-half wavelength long, to provide sufficient length for application of the pick-up assembly thereto. However, when the magnetostrictive member is made one-half wavelength long, it is resonant or tuned to the resonant frequency of the vibrator unit, and can only be effectively used when the vibrator unit with which it is associated operates at maximum amplitude over a relatively narrow frequency band. When the vibrator unit is designed to operate in the frequency range in the order of 30 kc. to 40 kc., the magnetostrictive member may have a longitudinal length in the range above one-fourth wavelength but below one-half wavelength at the operating frequency; and when the vibrator unit is designed to operate in the frequency range in the order of 25 kc. to 30 kc., the magnetostrictive member may have a longitudinal length of less than one-quarter wavelength at the operating frequency; and when the vibrator unit is designed to operate at frequency ranges of 20 kc. and below, the magnetostrictive member may have a longitudinal length of approximately one-eighth wavelength or less, at the operating frequency. Magnetostrictive members of the sensing devices made in accordance with this invention which are less than one-half wavelength long, are non-resonant at the operating frequency, and thus can be effectively used in association with a vibrator unit which operates over a wide frequency band, or can be selectively used with any one of a series of vibrator units which collectively operate over a relatively wide range of frequencies.

The pickup coil of a sensing device of this invention is wound on a supporting tube or spool formed of non-magnetic and nonconductive material, which is loosely telescoped over the magnetostrictive member and suitably supported in the area of maximum stress in the member or element. When the magnetostrictive member is in the form of a wire, rod, bar or tube of uniform cross-section, the region of maximum stress or mechanical impedance occurs in the midsection of the member when made one-half wavelength long; when the magnetostrictive member is made less than one-half wavelength long but more than one-quarter wavelength long, the region of maximum stress occurs about one-quarter wavelength from the free end of the member; and when the magnetostrictive member is made less than one-quarter wavelength long, the region of maximum stress occurs in the region of attachment of the member to the vibration transmitting component of the vibrator unit. To reduce flexural stresses in the magnetostrictive member, it is preferably made less than one-fourth wavelength long, when such length is sufficient to accommodate the pick-up assembly of the sensing device, as when operating at approximately 30 kc. or below.

The electromotive force induced in the surrounding pick-up coil is a function of the amplitude of vibration of the magnetostrictive member or section. Polarization of the magnetostrictive member or section can be effected by an electromagnet, in which case the pickup coil may be supplied with direct current so that it also acts as the coil of the electromagnet. A permanent magnet is, however, preferably used to polarize the magnetostrictive member, and in which case a permanent magnet ring may be used which is preferably separated from the pickup coil by a nonmagnetic spacer ring or element also loosely telescoped over the magnetostrictive member; and which together provide a desirable pickup assembly, since in this assembly the electromotive force generated by the pickup coil may be of sufficient magnitude for the direct operation of an associated amplitude indicating meter or generator tuning means, without amplification of the electromotive force generated by the pickup coil.

The above, and other objects, features and advantages of the invention, will be apparent from the following detailed description of the invention which is to be read in connection with the accompanying drawings forming a part hereof, and wherein:

FIG. 1 is an elevational view of a sensing device embodying the present invention and shown associated with an acoustically vibrated vibration transmitting component of a vibrator unit.

FIG. 2 is an enlarged, vertical sectional view of a sensing device made in accordance with this invention and whose polarized magnetostrictive member is in the form of a wire or rod; and FIG. 3 is a wiring diagram showing a polarizing circuit designed for association with the sensing device shown in FIG. 2, and which embraces an amplitude indicating meter.

Figure 13:
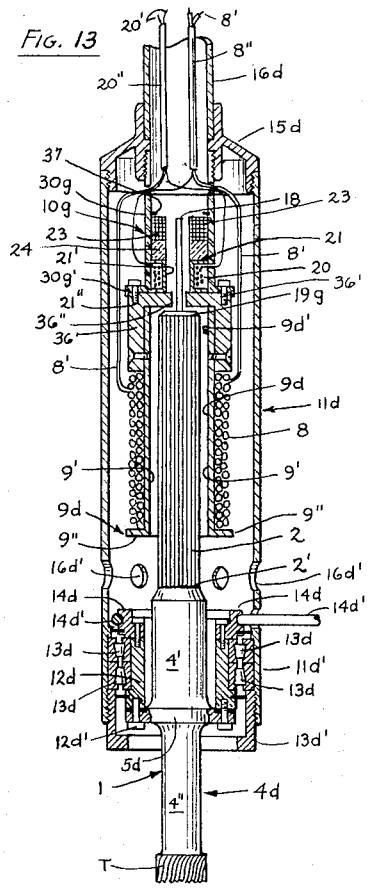

FIG. 4 is a sectional view taken along line 4—4 of FIG. 5, which shows another embodiment of a sensing device made in accordance with this invention, and whose magnetostrictive member is in the form of a bar of rectangular cross-section which is polarized by a permanent magnet; and FIG. 5 is a sectional view of the sensing device shown in FIG. 4 as the same would appear when viewed along line 5—5 of FIG. 4.

FIG. 6 is a sectional view of a further embodiment of a sensing device made in accordance with this invention, and whose magnetostrictive member is tubular in form and polarized by a permanent magnet.

FIG. 7 is a longitudinal section of another form of vibrator assembly whose vibrator unit has a vibration transmitting component or tool with which a pair of sensing devices of modified form are associated, one of these sensing devices having its magnetostrictive member fixed to the vibration transmitting component at a loop of longitudinal vibration thereof, and the second sensing device having its magnetostrictive member fixed to a loop of radial vibration of the vibration transmitting component;

FIG. 8 is an enlarged vertical section of the modified sensing device shown in FIG. 7, and whose magnetostrictive member may be fixed to a loop of longitudinal vibration and/or a loop of radial vibration of the vibration transmitting component of the vibrator unit as shown in FIG. 7;

FIG. 9 is an enlarged vertical section of a further embodiment of a sensing device made in accordance with this invention, and whose magnetostrictive member is adapted for attachment to a vibration transmitting component of a vibrator unit such as shown in FIG. 7, and whose miniature size and light weight pickup assembly is suspended from the upper end of the magnetostrictive member;

FIG. 10 is a transverse section of the vibrator assembly as the same would appear when viewed along line 10—10 of FIG. 7, this view showing a sensing device constructed as shown in FIG. 8, and whose magnetostrictive member is attached to the vibration transmitting component in the area of a loop of radial vibration thereof, this view also showing further details of the manner in which the pickup assembly of the sensing device may be removably mounted on a side wall of a box-shaped jacket extension of the vibrator assembly;

FIG. 11 is a fragmentary perspective view of the lower end portion of the vibrator assembly shown in FIGS. 7 and 10, and which reveals further details of the pickup assembly as mounted on a removable side wall of the box formation at the lower end of the jacket extension of the vibrator assembly; and FIG. 12 is a further fragmentary perspective view of the lower end portion of the vibrator assembly shown in FIG. 7, and as the same would appear when the side wall of the box formation which supports the pickup assembly of the sensing device has been removed, thereby exposing the magnetostrictive member of the pickup device as attached to the area of a loop of radial vibration of the vibration transmitting component of the vibrator assembly.

Figure 14:
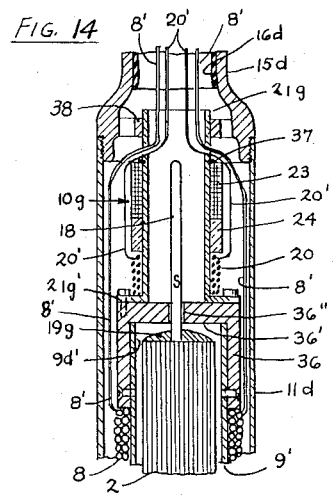

FIG. 13 is a longitudinal section of a further form of vibrator assembly whose vibrator unit and work tool is designed to rotate and simultaneously vibrate in the longitudinal mode, this view also showing a sensing device made in accordance with this invention whose magnetostrictive member is fixed to the upper end of the transducer stack in axial alignment therewith and thus rotates with the vibrator unit, with the pickup coil and permanent magnet of the pickup assembly surrounding the rotated magnetostrictive member and supported by and within a stationary tube suspended from the end closure of the vibrator assembly; and FIG. 14 is a fragmentary longitudinal section showing a modification of the embodiment illustrated in FIG. 13, and wherein the pickup coil and permanent magnet of the pickup assembly are mounted on the outside of a stationary tubular section of the vibrator assembly and in surrounding relation to the rotated magnetostrictive member of the sensing device.

FIG. 15 is a vertical section of a cleaning tank containing a cleaned fluid in which workpieces to be cleaned are immersed, and whose bottom wall presents openings through which the end faces of vibration transmitting components of a series of vibrator units extend to vibrate the cleaning fluid, with each of said vibration transmitting components equipped with a sensing device made in accordance with this invention, this view being taken along line 15—15 of FIG. 16; and FIG. 16 is a horizontal section of the cleaning tank assembly as viewed along line 16—16 of FIG. 15, and which includes a selective switch having a series of contacts connected to the pickup leads of the respective sensing devices.

FIGS. 17, 18, and 19 are diagrammatic illustrations of typical magnetostrictive members adapted for association with the sensing devices shown in FIGS. 2–6, FIGS. 7–12 and FIGS. 13 and 14, and which diagrammatically illustrate the performance characteristics of various lengths thereof.

FIG. 20 is a triode tube circuit diagram designed for association with the sensing devices of this invention and which is operative to automatically adjust the transducer energizing power circuit in a manner to automatically maintain the vibrator unit at resonance frequency and maximum amplitude.

FIG. 21 is a transistorized circuit diagram designed for association with the sensing devices of this invention and which is operative to automatically adjust the transducer energizing power circuit in a manner to maintain the vibrator unit at resonance frequency and maximum amplitude; and FIGS. 22 and 23 are diagrammatic illustrations of a partial modification of the transistorized circuit diagram shown in FIG. 21.

Similar reference characters refer to similar parts throughout the several views of the drawings and specification.

Referring to the drawings, the sensing devices made in accordance with this invention are generally designated 10. Each of these sensing devices fundamentally embraces a magnetostrictive member, section or element generally designated 18, and which is fixed to, or forms a part of, and is vibrated by, a work-performing vibrator unit which may be vibrated at frequencies ranging from about 5 kc. to 50 kc. or more. Each of these sensing devices also embraces a pickup assembly which includes, a pickup coil, generally designated 20, which is contained within a support or housing, generally designated 30, with the pickup coil 20 positioned in surrounding relation to the magnetostrictive member, section or element 18, and with the housing 30 supported in spaced relation to the vibration transmitting component to which the magnetostrictive member is attached or associated. When the magnetostrictive member, section or element is vibrated by a vibration transmitting component of the vibrator unit, an alternating voltage is generated in the pickup coil whose magnitude is influenced by the frequency and amplitude of vibration of the magnetostrictive member, section or element of the sensing device, corresponding to the frequency and amplitude of vibration of a vibrating part or component of the vibrator unit to which it is attached or associated. Throughout this specification, letter suffixes have been applied to numerals 10, 18 and 30 to indicate various modifications of these parts of the sensing devices embodied by this invention.

The sensing devices of this invention are preferably designed for association with a vibration transmitting component of a work-performing vibrator unit which forms the working part of a vibrator assembly as illustrated in the accompanying drawings. FIG. 1 illustrates a typical form of vibrator assembly with which one or more of the sensing devices of this invention may be associated, and which includes a vibrator unit 1 embracing an electromechanical, piezoelectric or magnetostrictive transducer 2, and preferably a transducer of the magnetostrictive type as shown in FIG. 1. One end of the magnetostrictive laminates which compose the transducer 2, are rigidly bonded by joint 2′ to a primary vibration transmitting connecting body 4 whose length corresponds to one-half wavelength of sound or integral multiples thereof traveling longitudinally through the connecting body. The vibration transmitting connecting body as shown in FIG. 1 may be designed as an amplitude increasing acoustical impedance transformer by making its vibration input section 4′ of larger mass than the vibration output section 4″ thereof, and may have a nodal flange 5 to provide support for the vibrator unit.

A secondary vibration transmitting component 6 forming a part of its vibrator unit, is permanently or detachably secured to the vibration output section 4″ of the connecting body 4, as by means of a coupling connection 7 which includes a threaded stud 7′ secured to the vibration input end of the secondary vibration transmitting component 6. The secondary vibration transmitting component 6 may be approximately one-half wavelength long, and may be designed as a secondary amplitude increasing acoustical impedance transformer by making its vibration input section 6′ of larger mass than its vibration output section 6″, and may be provided with a flat end face 6‴ for agitating or cavitating liquids in which it is immersed. The connecting body 4, and tool holder or tool 6, are formed of a material of high tensile strength and capable of transmitting high frequency vibrations longitudinally therethrough. The transducer 2 is energized to vibrate in the longitudinal mode by a high frequency alternating magnetic field which is produced by an energizing coil 8 which surrounds the midsection of the transducer 2, and which is supplied with biased high frequency alternating current from an exterior oscillator generator (not shown).

The energizing coil 8 may be supported on a coil supporting member or spool 9 having a tubular body 9' around which the energizing winding is applied, and through whose bore the transducer 2 loosely extends. The winding supporting spool 9 is provided with winding confining end flanges 9" which may be supported by the surrounding stationary casing 11 of the vibrator assembly. The lower end of the stationary casing 11 of the vibrator assembly may be provided with an inturned flange portion 12 to which the nodal flange 5 of the connecting body is secured by suitable resiliently cushioned securing screws 13 and thus provide the support for the vibrator unit 1 of the vibrator assembly. The winding leads 8' of the energizing coil 8 may be contained in a protective sheath 8" extending through the wall of the vibrator assembly casing 11. Suitable holes or openings 9''' may be provided in the flanges 9" of the winding supporting spool 9 for the passage of air or other coolant therethrough which maintains the winding 8 as well as the transducer 2 relatively cool during operation.

The vibration transmitting component or tool 6 of the vibrator unit 1 presents a loop of longitudinal vibration at that end thereof to which the vibration output section 4" of the vibration transmitting connecting body 4 is attached, and the shoulder formation presented by the tool 6 at this area provides an effective and convenient location for placement of the relatively small sensing device of this invention.

FIG. 2 illustrates a generic form of sensing device 10 embodying the present invention and which may be associated with the vibration transmitting component 6 of the vibrator assembly shown in FIG. 1. This sensing device 10 includes a magnetostrictive member 18 in the form of a small rod, bar or wire made of permanickel, nickel, permendur or other metals or materials which have high tensile strength and which are highly magnetostrictive in character. The magnetostrictive member 18 as shown in FIG. 2 is permanently magnetized, thus providing its own polarization. Assuming the vibration transmitting component 6 and work tool attached thereto, is vibrated in the longitudinal mode, and has a combined longitudinal length substantially conforming to one-half wavelength of sound traveling longitudinally therethrough at the frequency of vibration, the work tool or component 6 will present a loop of longitudinal vibration at the upper end thereof and a loop of radial vibration at the side thereof and in the region of a mode of longitudinal vibration. To effectively sense the amplitude of vibration of the vibration transmitting component 6, the magnetostrictive member 18 is rigidly attached at one end thereof to the component 6, by brazing or by threaded connection 19 as shown in FIG. 2, in the area of a loop of longitudinal vibration or a loop of radial vibration of the vibration transmitting component 6. To avoid flexural vibrations and flexural strains in the magnetostrictive member 18, the member 18 is preferably so attached to the component 6 as to present its longitudinal axis in a direction parallel to the longitudinal vibrations or parallel to radial vibrations of the component 6. Further, in order to minimize the loading of the work tool, the wire, bar or rod forming the magnetostrictive member 18 preferably has a small cross-section and only sufficient in length to apply the pickup assembly thereto. For example, in a practical application of the embodiments of the invention illustrated in FIG. 2, the magnetostrictive member 18 may have a cross-section of only .001 inch and a length of only .60 inch when secured to a tool operated at a frequency of 20,000 cycles per second. The fractional wavelength of the member 18 is preferably selected in accordance with the frequency at which it is to be vibrated, as hereafter explained.

The magnetostrictive member 18 may be polarized or magnetized so that, when acoustic energy is transmitted thereto from the vibrated work tool 6, the consequent changes in the magnetic field of the polarized magnetostrictive member 18 will be effective to induce an electromotive force in the coil or winding 20 of a pickup assembly extending loosely around the member 18. The magnitude of the electromotive force induced in coil 20 is a function of both the amplitude and frequency of the vibrations produced in work tool or vibration transmission component 6, so that the resonance frequency and maximum amplitude of vibration of the component 6, and any variations in frequency and amplitude of vibration of the component 6, is reflected in corresponding variations in the electromotive force induced in the pickup coil 20.

Polarization of the magnetostrictive member 18 may be effected either by a permanent magnet or an electromagnet. In the embodiment of the invention illustrated in FIG. 2, the magnetostrictive member 18 is electromagnetically polarized, and the coil 20 functions both as a pickup coil and as the coil of the electromagnet. The coil 20 is supported by a suitable coil holder or spool 21 which has a tubular body 21' through which the magnetostrictive member 18 loosely telescopes and on which the transducer energizing winding is applied, and which may have coil confining flanges 21" at each end thereof. The coil 20 and its winding supporting spool 21 may be pocketed within a pair of complementary cup-shaped members 22 and 22' formed from ferromagnetic material such as ferrite or the like, and which together provide a ferromagnetic shell surrounding the coil 20 and a flux path for the magnetic field of coil 20, and through which the magnetostrictive member 18 loosely extends. The magnetic shell, formed by the magnetic cup-shaped member 22 and 22', provide return paths for the magnetic lines of flux passing along the magnetostrictive member 18 in response to energization of the coil 20 by direct current, which then also serves as the coil of an electromagnet, and which magnetic flux path increases the strength of magnetization of member 18.

The pickup assembly, comprising the pickup coil 20, supporting spool 21 and the complementary magnetic cups 22–22' through which the magnetostrictive member 18 loosely extends, may be independently supported by any suitable support or housing 30. The housing 30 may be provided with an inturned bottom flange 30' which supports the pickup assembly, and its opposite end may be provided with an outturned flange 30" fixed to a suitable supporting arm 51. The winding leads 20' from the pickup coil 20 may extend through a suitable hole 31 formed in one or both of the magnetic cup-shaped members 22 and/or 22', and through an adjacent hole formed in the housing 30. The pickup coil winding leads 20' may be encased in a suitable insulating sheath 20" and form a part of an amplitude indicating circuit such as shown in FIG. 3. Since the electromotive force or voltage induced in the pickup coil 20 depends upon the alterations in the magnetic field produced by the polarized magnetostrictive member 18 when vibrated, relative movement of the pickup assembly and its pickup coil 20 and the magnetostrictive member 18, does not affect the accuracy of the sensing device in producing an electrical signal which is a function of the amplitude and frequency of the transmitted acoustical energy. Thus, the pickup coil can form a part of a pickup assembly that is separable from the magnetostrictive member 18 and the vibration transmitting component 6 of the vibrator unit. When the complementary cups 22–22' are formed of ferromagnetic material, the magnetostrictive member 18 must be permanently magnetized. However, where one or both magnetostrictive cups 22–22' are permanent magnets, the magnetostrictive member would be magnetized thereby.

The sensing device 10 shown in FIGS. 1 and 2 may be independently supported, as from the casing 11 of the vibrator assembly shown in FIG. 1, by an independent support 50 which includes a supporting arm 51 to which the housing 30 of the pickup assembly is secured. One end of the supporting arm 51 may be journalled on a pivot pin 52 fixed to a secondary arm 53. The secondary arm 53 may be secured to one end of a tubular sleeve 55 which is slidable on a rod 56 extending through the sleeve 55. The upper end of the rod 56 is secured to a companion secondary arm 53', one end of which may be rigidly fixed to the vibrator assembly casing 11. A pair of set screws 56' may be provided to adjustably secure the sleeve 55 to the rod 56, and whereby the supporting arm 51 and the pickup assembly attached thereto may be telescopically adjusted with respect to the magnetostrictive member 18 as fixed to the vibration transmitting component 6 of the vibrator unit. To further accommodate the pickup assembly to the various positions at which the magnetostrictive member 18 may be attached to the vibration transmitting component 6, the pickup assembly supporting arm 51, may be swingably adjusted but frictionally held by means of a helical spring 54 telescoped over the shank section of the pivot pin 52 and between the enlarged head of the pin and an enlarged boss portion formed on the arm 51. Thus, the position of the pickup assembly and its pickup coil 20 may be adjusted as required to loosely telescope over the magnetostrictive member 18, as may be necessary when the member 18 is relocated or replaced for any reason, or when the vibration transmitting component 6 is attached or reattached to the connecting body 4, or when the entire vibrator unit 1 is removed or reattached to the casing 11 by the screws 13.

The coil 20 of the sensing device 10 shown in FIG. 2 may form a component part of an electrical circuit 60, as shown in FIG. 3, which is so designed that the coil 20 functions both as a pickup coil and the coil of an electromagnet for polarizing the magnetostrictive member 18. The illustrated electrical circuit includes a transformer 61 whose primary winding 61' is connected to alternating current supply line 60'. One end of the secondary winding 61" of the transformer 61 is connected to a rectifier 62 from which direct current flows through conductor 62' to a first resistance 63, thence flows through conductor 63' to a second resistance 64, and thence flows through conductor 64' into one of the leads 20' of the pickup coil 20 and which causes the same to operate as the coil of an electromagnet. The other end of the secondary winding 61" of the transformer 61 is connected to a second rectifier 62a and thence by conductor 62b to the conductor 62' extending between the primary rectifier 62 and an adjustable first resistance 63, and by means of which the direct current may be varied. A tap 65 makes current contact with the secondary winding 61" of the transformer 61, and is connected through conductor 65' to the other lead 20' extending from the pickup and electromagnetic coil 20. A condenser 66 is connected on one side thereof by conductor 66' to the conductor 63' extending between the primary resistance 63 and the secondary resistance 64, and the other side of the condenser 66 is connected by conductor 66" to the tap conductor 65' and then grounded as at 66'''. A suitable amplifier 68 which is grounded at 67', has an input conductor 67 which is connected to the first-mentioned lead 20' extending from the pickup and electromagnetic coil 20. The output terminals 68" of the amplifier 68 are connected to a voltmeter 69 which may have a suitable amplitude indicating instrument 69' associated therewith.

In the above-described electrial circuit, the first and second resistances 63 and 64 and the condenser 66 may be dimensioned in accordance with the following proportions: approximately 10 ohms for resistance 63, approximately 1000 ohms for resistance 64 and approximately 1000 microfarads for condenser 66. In the above-described electrical circuit, direct current is generated by the centertapped transformer 61 and full wave rectifiers 62 and 62a, in conjunction with the filter network consisting of resistor 63 and condenser 66. Undue depression of the high frequency voltage in coil 20 by the condenser 66, is avoided by the interposition of a high impedance element 64 in the form of a resistor, or preferably, a so-called choke. The induced alternating current is carried by conductor 67 to the amplifier 68 where the signal is suitably amplified for operation of the voltmeter 69. It will be appreciated that the second resistance 64 may be replaced by a choke which functions in the same manner to prevent feeding-back of the induced alternating current. The voltmeter 69 may have an instrument 69' associated therewith, which contains the appropriate circuitry known in the art, and which is calibrated to indicate either the amplitude of frequency of the vibrations in the work tool 6 or other body to which the magnetostrictive member 18 is attached. It is also apparent that the amplified signal from amplifier 68 may be employed to operate an amplitude recording device, or to operate automatic means for tuning the oscillator generator into frequency match with the resonance frequency of the vibration unit 1 and its vibration transmitting component 6 to which the magnetostrictive element 18 of this sensing device is attached.

While the magnetostrictive member 18 may be polarized by supplying direct current to the coil 20 so that it will operate as the coil of an electromagnet as well as a pickup coil as shown in FIGS. 2 and 3, it will be appreciated that the magnetostrictive member 18 may also be polarized by the use of a separate electromagnetic coil. A more simplified circuit than that shown in FIG. 3 can be used when the magnetostrictive member is polarized by a permanent magnet 23 which forms a part of the pickup assembly of its sensing device, as shown in FIGS. 4, 5 and 6. The permanent magnet 23 may be shaped in the form of a ring which is telescoped over the magnetostrictive member and may be positioned between the flux conducting cups 22—22' and in surrounding relation to the pickup coil 20 as shown in FIGS. 4, 5 and 6. The permanent magnet 23 has opposite polarities at the opposite faces thereof, so that the complementary cups 22–22', formed of ferrite or the like, complete the path for the magnetic lines of flux extending longitudinally along the magnetostrictive member. Where the magnetostrictive member is in the form of a wire or rod as shown in FIG. 2, or in the form of a tubular member 18b as in the sensing device 10b shown in FIG. 6, the permanent magnet 23, the flux conducting cups 22—22', and the tubular body 21' of the pickup coil supporting spool 21 are preferably made cylindrical in form, with the magnetostrictive member 18 or 18b extending loosely through the tubular body 21' of the coil supporting spool 21, and through the circular holes extending axially through the flux conducting cups 22–22' and substantially in axial alignment with the bore of the winding spool body 21'.

The magnetostrictive member of the sensing device 10a of this invention may also be made in the form of a polygonal bar, and may have a generally rectangular cross-section as shown in FIGS. 4 and 5, and whose transverse width is greater than the thickness of the member. As thus made, the magnetostrictice member 18a is more sensitive to flexural vibrations in one direction about its neutral axis, and is thus able to discriminate with respect to the direction of vibrations of the vibration transmitting component of the vibrator unit to which it is attached. A magnetostrictive member 18a of generally rectangular cross-section such as shown in FIGS. 4 and 5, is particularly useful when bending waves are encountered, since its cross-sectional shape serves to resist bending waves, and its larger surface area subject to vibration enhances its performance. It will be appreciated that the rectangular shaped member 18a may also be made tubular in form to reduce its mass weight, and yet retain the advantages of rectangular form. When the magnetostrictive member 18a of the sensing device 10a as shown in FIGS. 4 and 5, is made rectangular in cross-section, it will be apparent that the tubular body 21' of the winding supporting spool 21, as well as the axial holes in the flux conducting cups 22–22' through which the rectangular shaped member 18a extends, are preferably made of corresponding rectangular form, but sufficiently large to permit the rectangular shaped magnetostrictive member 18a to loosely telescope therethrough.

When a tubular magnetostrictive member 18b as shown in FIG. 6 is attached to the vibration transmitting component of a vibrator unit in the area of a loop of vibration thereof, flexural bending strains in the tubular member 18b are greatly reduced, and can be advantageously used in some cases. The magnetostrictive tube 18b preferably has a relatively thin cylindrical wall of small external diameter, to thereby reduce its mass and avoid appreciable loading of the vibration transmitting component of the vibrator unit to which it is attached.

The pickup assembly of the sensing devices constructed in accordance with this invention, may be made miniature in size and in various forms so that the magnetostrictive member to which it is applied may be variously positioned and secured to a vibration transmitting component in regions of a loop of vibration. These miniature sensing devices will effectively and efficiently sense the amplitude of vibration of the vibration transmitting component of a work-performing vibrator unit without obstructing or impeding the manipulation or operating efficiency of the vibrator unit or the vibrator assembly with which it is associated. By way of exemplification, FIG. 7 discloses a sensing device 10c made in accordance with this invention which is applied to a vibration transmitting component 6 of a vibrator unit 1 at a loop of longitudinal vibration thereof, and a similar sensing device 10c is applied to the vibration transmitting component in the region of a loop of radial vibration thereof. The pickup assembly of the sensing devices 10c shown in FIG. 7 are so mounted and constructed that they do not interfere with the efficient performance of the vibrator unit 1, and permit the vibrator unit to be readily removed and reapplied to the vibrator assembly structure which supports it.

The vibrator assembly shown in FIG. 7 and FIGS. 10–12 for purposes of illustration, essentially comprises a vibrator unit 1 whose transducer stack 2 is secured at one end thereof by a rigid bonding joint 2' to one end of a vibration transmitting connecting body 4a presenting a nodal flange 5a. The connecting body 4a is designed to provide a primary magnification of the amplitude of vibrations transmitted to one end thereof by the transducer stack 2, by making its vibration input section 4' on one side of its nodal flange 5a of larger mass than its vibration output section 4'' on the other side of the nodal flange. The tool holder or tool 6 may also be designed to provide secondary magnification of the amplitude of vibrations injected into it by the connecting body 4a, by making its vibration input section 6' of larger mass than the vibration output section 6'' thereof. The tool holder or tool 6 may be provided with a flat end face 6''' and used to cavitate liquids, or may have a suitable work tool secured thereto for performing various machining operations. The connecting body 4a and tool holder or tool 6 are each made of a metal or material of high tensile strength and effective vibration transmitting capabilities, and each have a longitudinal length corresponding to one-half wavelength of sound or integral multiples thereof traveling longitudinally therethrough at the frequency at which the transducer stack 2 is vibrated. The tool holder or tool 6, may be formed of a different vibration transmitting material than the connecting body 4a, and may be detachably secured to the connecting body by means of a suitable coupling 7 having a threaded stud 7' which is threaded into a conforming bore in the vibration input end of the tool holder or tool 6.

The transducer stack 2 and a part of the connecting body 4a of the vibrator unit is contained within a tubular casing 11a whose upper end is closed by a suitable end closure 15 which may be secured to an inturned rim 11a' of the casing 11a as by screws as shown in FIG. 7. The stationary energizing coil 8 surrounds the midsection of the transducer stack 2 and is wound on the tubular body section 9' of a suitable supporting spool 9a through which the transducer stack 2 loosely extends and which spool may be provided with winding confining flanges 9''. The winding spool 9a may be mounted in position by a hanger 15' which may form an extension of the tubular body 9' of the spool 9a. The suspension hanger 15' may be provided with an outturned rim at the upper end thereof which may be secured to the end closure 15 as by suitable screws and thus made removable with the end closure 15 and casing 11a. The winding leads 8' extending from the energizing coil 8 may be threaded through the suspension hanger 15' and then through a suitable coupling 15'' supported by the end closure 15, and which thence lead to a suitable oscillating generator (not shown) which provides the biased high frequency alternating current to the energizing coil 8, and which in turn generates a high frequency alternating magnetic field which passes through the tubular wall 9' of the nonconductive and nonmagnetic spool 9a without interference, and into axially energizing relation to the transducer stack 2.

The nodal flange 5a of the vibrator unit 1 of the connecting body 4a provides a convenient means for removably supporting the vibrator unit. The lower end of the vibrator unit supporting casing 11a may be provided with a tubular mounting block 12a secured thereto as by screws. The nodal flange 5a of the vibrator unit may be provided with a peripheral groove within which a resilient sealing ring or gasket 14 is positioned, and whose outer periphery snugly abuts a shoulder formed on the inner face of the mounting block 12a. A supporting collar 14', which may be formed of metal or of a vibration absorbing and nonconductive material, surrounds the inner face of the mounting block 12a and provides support for the resilient ring 14, and the collar 14' may in turn be supported by a supporting plate 14'' which is removably secured to the underface of the mounting block 12a as by suitable screws or bolts. As thus constructed, the entire vibrator unit 1 may be withdrawn from and reapplied to the mounting block 12a and the tubular vibrator assembly casing 11a. The mounting block 12a also provides a means 50c for supporting the pickup assembly of the sensing device 10c whose magnetostrictive member 18 is fixed to the upper shoulder of the vibration transmitting component 6 of the vibrator unit, with the longitudinal axis of the member 18 extending substantially parallel to the direction of longitudinal vibration of the component 6.

Suitable means should also be provided for cooling the transducer stack 2 and its energizing coil. A liquid or gaseous coolant may be admitted into the chamber and confined within the casing 11a between the end closure 15 and the mounting block 12a thereof. As a modification, the casing 11a may be enclosed within a tubular cooling jacket 16 secured to the mounting block 12a, and which defines a cooling space into which a suitable coolant is admitted through a supply tube 16' at the lower end of the jacket and the warmed coolant withdrawn through a tube at the upper end of the jacket.

To provide support for that pickup assembly of the sensing device 10c which is associated with the magnetostrictive member 18 extending laterally from the vibration transmitting component 6 as shown in FIG. 7, a tubular suspension sleeve 17 may be detachably secured at the upper end thereof to the mounting block 12a as by suitable securing screws. The removable suspension sleeve 17 encloses the lower part of the connecting body 4a and the upper part of the tool or tool holder 6, and may be provided with a box formation 17' removably attached as by securing screws to the lower end of the sleeve 17. The box formation 17' as shown in FIGS. 7, 10, 11 and 12 may be rectangular in form and positioned to surround the midsection of the tool holder 6. The box formation 17' may be provided with a removable side wall 17'' secured to the box formation as by removable screw 17'''. The removable side wall 17'', positioned adjacent the magnetostrictive member 18 which extends laterally from the midsection of the tool holder 6, provides support for the housing 30c of the associated pickup assembly, as hereafter more fully described.

The sensing device 10c positioned in the region of a loop of longitudinal vibration, and/or a loop of radial vibration, of the vibration transmitting component 6 as shown in FIG. 7, may be constructed as illustrated in FIG. 8 in enlarged form. The miniature sensing device 10c comprises a magnetostrictive member 18 in the form of a wire, rod or bar, of small cross-section and having a threaded end extension 19 which is secured to the vibration transmitting component 6, and whose longitudinal axis extends in the direction of the longitudinal vibrations, or in the direction of the radial vibrations, of the vibration transmitting component 6. The pickup assembly of the sensing device 10c comprising a pickup coil 20 wound on the tubular body 21' of a supporting spool 21 having winding confining flanges 21''. A permanent magnet ring 23 encircles the upper end of the magnetostrictive member 18, and is maintained in spaced relation to the pickup coil 20 and spool 21 by means of a spacer ring 24 formed of nonconductive and nonmagnetic material. To insure proper alignment of the pickup assembly with respect to the magnetostrictive member 18 extending therethrough, a tubular ferrule 24' formed of nonconductive material having a low friction coefficient, may be loosely telescoped over the magnetostrictive member 18 and through the bore of tubular body 21' of the winding supporting spool and which partly projects into the bore of the non-conductive spacer ring 24. The pickup assembly is completed by a tubular housing 30c which may be formed of aluminum, and whose lower end may be provided with an inturned rim portion 30' through which the member 18 loosely extends. The pickup coil 20 and its spool 21, and the spacer ring 24 and permanent magnet ring 23 positioned thereabove, are thus supported by the rim portion 30' of the housing 30c, and may be compactly locked in position by an expansible clamp ring 31 which overlaps the magnet ring 23 and expands into a circumferential groove formed in the inner surface of the housing 30c. The pickup assembly comprising the permanent magnet ring 23, nonconductive spacer ring 24, pickup coil 20, its supporting spool 21 and the containing housing 30c, may be made miniature in size and compactly assembled to provide a pickup assembly whose total length may be less than one inch and whose exterior diameter may be substantially less than one inch.

It will be noted that the pickup coil 20 is positioned adjacent the lower end of the magnetostrictive member 18 where the maximum stress therein occurs as a result of the vibrations transmitted to it by the vibration transmitting component 6 of the vibrator unit. It will also be noted that the premanent magnet ring 23 is maintained in spaced relation to the pickup coil by the spacer ring 24, and so that the magnetostrictive member 18 is magnetized thereby, with the resultant magnetic lines of flux traveling longitudinally through the member 18 for substantially the entire length thereof.

The pickup assembly of the sensing device 10c above-described and shown in FIG. 8, is supported independently of the magnetostrictive member 18 and the vibration transmitting component 6 to which the magnetostrictive member is attached. The support means 50c, as shown in FIG. 7, may comprise a laterally extending supporting arm 51c to which the pickup assembly housing 30c is suitably clamped. A suspension rod 57 presents an upper end portion which is threaded into the underface of the mounting block 12a of the vibrator assembly and thus suspended therefrom as shown in FIG. 7. The lower end of the suspension rod 57 may have an adjustable nut 57' applied thereto. The suspension rod 57 extends through the support arm 51c, and the arm 51c is clamped between a pair of upper and lower collars 58 and 58' telescoped over the rod 57, with the lower clamping collar 58' supported by the adjustable nut 57'. A helical compression spring 59 is telescoped over the rod 57, and one end thereof seats on the upper clamping collar 58, and the other end thereof seats against a compression nut 59' threaded on the rod 57 near the upper end thereof. By adjusting the nut 59', the compresion spring 59 may be compressed to frictionally clamp the pickup housing supporting arm 51c between the upper and lower clamping collars 58 and 58'. The housing 30c and the parts of the pickup assembly contained therein, may be elevated and lowered by a suitable manipulation of the nut 57' at the lower end of the rod 57, and the arm 51c may be laterally swung to various positions to accommodate the pick-up assembly to the magnetostrictive member 18 as secured to the vibration transmitting component 6 of the vibrator unit.

When the magnetostrictive member 18 is secured to the vibration transmitting component 6 of the vibrator unit to extend laterally therefrom as shown in the lower right hand side of FIG. 7, and also shown in FIGS. 10, 11 and 12, the housing 30c of the pickup assembly 10c may be provided with a threaded exterior 30'' which may be threaded into a threaded hole formed in the removable side wall 17'' of the box formation 17' as shown in FIGS. 7, 10 and 11. The pick-up assembly is thus rigidly supported so that the laterally projecting magnetostrictive member 18 extends loosely therethrough, and can be readily removed from its telescoped position with respect to the member 18 by removing the side wall 17'' of the box formation 17' of the vibrator assembly.

The leads 20' from the pickup coil 20 associated with the sensing device 10c may be threaded through a suitable hole formed in the pickup assembly housing 30c and then encased in a protective sheath 20''. The winding leads 20' form a part of a pickup circuit which includes an amplitude indicating instrument, or form a part of a tuning circuit, as hereafter described, and by means of which the frequency of vibration of the oscillator generator may be tuned to automaticaly maintain the vibrator unit 1 at resonance frequency and maximum amplitude.

The sensing device 10c as shown in FIG. 8 may be modified as shown in FIG. 9 to provide a sensing device 10d whose pickup assembly requires no independent support, but may be suspended from the upper end of the magnetostrictive member 18 with which it is associated. In this form of the invention, the pickup assembly comprises a cup-shaped housing 30d made from aluminum or the like, and which contains a pickup coil 20 applied to a winding spool 21 whose tubular body 21' loosely telescopes over the magnetostrictive member 18. A permanent magnet ring 23 is contained in the cup-shaped housing 30d, and maintained in spaced relation to the pickup coil 20 and its supporting spool 21, by a nonconductive and nonmagnetic spacer ring 24 as shown in FIG. 9. An expansible clamp ring 32 expands into a circumferential groove formed in the inner wall of the cup-shaped housing 30d adjacent the open end thereof, and provides support for the pickup coil 20, spool 21, spacer ring 24 and permanent magnet 23. An upper expansible clamping ring 33 seats against the adjacent face of the permanent magnet ring 23, and expands into a corresponding groove formed in the interior surface of the cup-shaped housing 30d adjacent the closed end thereof. The upper clamping ring 33 also has an axial hole whose rim is clamped into a groove formation 18''' formed in the member 18 adjacent the free end thereof, and thus provides suspension support for the entire pickup assembly. The magnetostrictive member 18 may be made in the form of a wire, rod or bar of small cross-section, and the entire pick-up assembly comprising the cup-shaped housing 30d, and the pickup coil 20, supporting spool 21, spacer ring 24 and permanent magnet ring 23 contained therein, may be telescopically applied and removed as a unit to and from the magnetostrictive member 18, and when aplied to the member 18, is suspended and supported from the upper end thereof without further support means. The expansible clamping ring 33 should be made of a low-friction material, such as nylon, so that the ring can be readily withdrawn and reapplied to the groove formation 18''' of pin 18 along with the housing 30d and pickup assembly contained therein. It will be noted that neither the cup-shaped housing 30d, nor the pickup components contained therein, are in contact with the vibration transmitting component 6 of the vibrator unit, when this pickup assembly is applied to and suspended from the magnetostrictive member 18. This pickup assembly is compactly assembled and may be made miniature in size and light in weight, so that it will not appreciably load or interfere with effective operation of the magnetostrictive member 18 or the vibration transmitting component 6 to which the magnetostrictive member 18 of the sensing device 10d is attached. This sensing device 10d not only permits elimination of an independent support for its pickup assembly, but has the further advantage that its removable and replacable pickup assembly may be selectively applied to a number of magnetostrictive members 18 formed as shown in FIG. 9 and secured at a number of points or areas to a vibration transmitting component of the vibrator unit.

Sensing devices made in accordance with this invention may also be associated with a vibrator assembly whose vibrator unit 1 longitudinally vibrates and simultaneously rotates to drive a suitable tool attached to the vibration output end of the vibrator unit, such as a milling cutter, or a boring, drilling, or reaming tool T, and which tool performs corresponding machining operations in hard materials as a result of the rotation and simultaneous vibration of the tool.

A simultaneously rotated and longitudinally vibrated vibrator unit 1 may be mounted for rotation by providing a vibrator assembly structure such as shown in FIG. 13. In this illustrative embodiment of the invention, the vibrator unit 1 embraces a transducer stack 2 rigidly bonded at one end by bonding joint 2' to a connecting body 4d and to whose vibration output end any form of rotated tool T such as a drilling, boring, reaming tool or milling cutter is secured, with or without the addition of an intervening tool holder, such as the tool holder 6 shown in FIG. 7. The tool supporting connecting body 4d and tool T attached thereto may have a longitudinal length corresponding to one-half wavelength of sound or integral multiples thereof traveling longitudinally through the material of the connecting body and tool, at the frequency of vibration of the transducer stack 2. The tool supporting connecting body 4d is provided with a nodal flange 5d which provides rotative support for the vibrator unit, and may be made to operate as an amplitude increasing acoustical impedance transformer by making its vibration input section 4' on one side of its nodal flange of larger mass than its vibration output section on the other side of its nodal flange.

The transducer stack 2 is energized to vibrate in the longitudinal mode by an energizing coil 8 whose winding leads 8' are connected to a biased high frequency alternating current generator so that the energizing coil 8 establishes a high frequency magnetic flux field axially through the transducer stack 2. The energizing coil 8 may be wound on the tubular body 9' of a winding spool 9d, but its tubular body 9' is sufficiently spaced from the transducer stack 2 to permit free rotation thereof. The winding supporting spool 9d may be provided with winding confining flange portion 9'' and the spool may be supported in suspended position as hereafter explained.

This vibrator assembly also includes a stationary casing 11d which encloses the transducer stack 2 and the winding supporting spool 9d. An end closure 15d is threadably or otherwise removably connected to the upper end of the casing 11d. The casing 11d is also provided with a stationary lower end extension 11d' which provides support for a rotatable driving barrel 12d contained therein, and to whose lower end the nodal flange 5d of the vibrator unit is secured as by suitable screws 12d' which are rubber cushioned so that the radial vibrations of the nodal flange 5d are not transmitted to the rotatable driving barrel 14d. One or more thrust bearing assemblies 13d are positioned between the rotatable driving barrel 12d and the lower end extension 11d' of the casing 11d, and are secured in position as by a bearing retainer ring 13d' which may be threadably secured to the lower end extension 11d' of the casing 11d. A ring-shaped pulley 14d is secured as by screws or bolts to the upper end of the rotatable driving barrel 12d. A drive belt 14d' is trained around the ring pulley 14d, extends through a slot in the stationary casing 11d, and thence is trained around a drive pulley driven by suitable exterior driving means such as gearing or an electric motor (not shown). As thus constructed, the vibrator unit 1 may be rotated at any desired rotative speed, and is free to simultaneously vibrate in the longitudinal mode, since its nodal flange 5d has substantially only a radial component of vibration which is absorbed by the resilient mounting which surrounds the securing screws 12d', and which nodal flange 5d has little or no vibration in the longitudinal mode.

The winding supporting spool 9d has an upper extension 9d' which may be suspended from the end closure 15d by first securing the spool extension 9d' to a cup-shaped member or collar 36 having an inturned upper rim portion 36'. A secondary supporting tube 30g, which may be of smaller diameter than the winding spool extension 9d', presents an outturned flange 30g' which may be secured as by suitable screws to the inturned rim portion 36' of the cup-shaped collar 36. The tubular secondary suspension tube 30g may be secured to the end closure 15d, or may form an integral part of a coolant supply tube 16d extending from the end closure 15d, and through which a gaseous coolant is introduced, enters the interior of the chamber defined by the casing 11d through slits or holes formed in the upper part of the secondary supporting tube 30g, flows around the transducer stack 2 and energizing winding 8 to cool the same; the warmed coolant escaping through holes 16d' in the lower end of the casing 11d.

In the modification shown in FIGS. 13 and 14, the sensing device 10g includes a magnetostrictive member 18, such as a small wire or small rod or bar of small cross-section which need not be more than approximately one inch in length. The magnetostrictive member 18 is fixed to the upper end of the transducer stack 2 as by a soldered joint 19g, with the longitudinal axis of the magnetostrictive member 18 extending in alignment with the longitudinal axis of the transducer stack 2, and thus rotates with the transducer stack about a common axis. The magnetostrictive member 18 extends through the small hole 36'' formed in the inturned rim portion 36' of the cup-shaped collar 36, so that the magnetostrictive member 18 may project therethrough and freely rotate. The pickup coil 20 of this sensing device is wound on a flanged supporting spool 21 which is contained within the secondary suspension tube 30g formed of nonconductive material such as a suitable plastic and which tube 30g thus provides the housing for the pickup assembly. The magnetostrictive member 18 extends through the tubular body 21' of the winding spool 21, and its lower flange 21'' may seat upon and be supported by the inturned rim 36' of the cup-shaped collar 36. The upper flange 21'' of the winding spool 21 in turn supports a spacer ring 24, formed of nonmagnetic and nonconducting material, and a permanent magnet ring 23 which is locked in position as by means of a resilient expansion ring 37 which overlaps the permanent magnet ring 23 and expands into an adjacent circumferential groove formed in the inner surface of the tubular pickup housing forming tube 30g.

As shown in FIG. 13, the winding leads 8' encased in a suitable protective sheath 8" extend through the coolant supply tube 16d and are connected to an exterior oscillator generator which provides biased alternating current of predetermined frequency to the energizing coil 8, and which coil in turn generates a corresponding high frequency alternating magnetic field in the rotatable transducer 2. The magnetostrictive member 18 is vibrated in the longitudinal mode by the energized and longitudinally vibrated transducer stack 2, and at the same frequency as the transducer stack. Where the magnetostrictive member is less than one-quarter wavelength long, the region of maximum stress S occurs therein adjacent the soldered joint 19g by means of which it is attached to the adjacent end of the transducer 2. The pickup coil 20 is positioned in adjacent relation to the region of maximum stress in the magnetostrictive member 18 and in surrounding relation thereto, so that when the magnetostrictive member 18 is vibrated, an electromotive force is induced in the pickup coil 20, which is delivered to its winding leads 20'. The winding leads 20' may be encased in a protective sheath 20" which extends through the coolant supply tube 16d and leads to an external pickup circuit having an amplitude indicating instrument associated therewith, or the pickup leads 20' may form a part of an automatic tuning circuit which adjusts the frequency of a biased high frequency alternating current generator to thereby maintain the vibrator unit 1 at resonance frequency and maximum amplitude.

When the pickup coil 20 is positioned in relatively close proximity ot the magnetostrictive transducer stack 2 and its energizing coil 8, as in the assembly shown in FIGS. 13 and 14, the pickup coil of the sensing device 10g or 10g' should be shielded from the influence of the alternating high frequency magnetic flux field traveling around and through the transducer stack 2 as generated by its energizing coil 8. Effective shielding of the pickup coil 20 may be accomplished by making the cup-shaped collar 36 of an effective alternating current flux shielding material, such as copper or aluminum. Thus, the cup-shaped collar 36 not only provides an element which connects the upper tubular extension 9d' of the winding spool 9d to the secondary tube 30g, but additionally provides an effective alternating current flux shield between the transducer 2 and its energizing coil 8, and the pickup coil 20 of the sensing device 10g or 10g' contained within the casing 11d of the vibrator assembly as shown in FIGS. 13 and 14.

In the modification fragmentarily illustrated in FIG. 14, the vibrator assembly and vibrator unit and the associated sensing device 10g' may be made similar to the corresponding parts shown in FIG. 13. For example, FIG. 14 illustrates a fragmentary part of the transducer stack 2 to which the magnetostrictive member 18 is secured by a soldered joint 19g, and with the longitudinal axis of the magnetostrictive member 18 in axial alignment with the transducer stack 2 so as to rotate therewith on the same axis, and which member 18 is also longitudinally vibrated by and at the same frequency as the transducer stack 2. The energizing coil 8 is wound on a spool 9d having a similar tubular spool body 9', which presents an upper extension 9d' which is telescoped into and is secured to the cup-shaped supporting collar 36, having an inturned rim 36' and provided with an axial hole 36" through which the magnetostrictive member 18 loosely extends. The vibrator unit 1 and sensing device 10g' of the modification shown in FIG. 14 is enclosed within a stationary casing 11d having an end closure 15d attached thereto and which provides the connection for a coolant supply tube 16d.

The modification shown in FIG. 14 differs from the structure shown in FIG. 13 in the respect that the upper extension 9d' of the energizing winding supporting spool, and the cup-shaped supporting collar 36, are in turn supported by a suspension tube 21g formed of nonconductive and nonmagnetic material, and whose lower end is provided with an outturned flange portion 21g' secured as by suitable screws to the inturned rim portion 36' of the cup-shaped suspension collar 36, and whose upper end is secured to a suspension spider 38 which is fixed to the interior surface of the end closure 15d. Thus, the suspension spider 38 and suspension tube 21g provide suspension support for the cup-shaped collar 36, the transducer energizing coil 8, and the supporting spool 9d on which the coil 8 is wound. The nonconductive and nonmagnetic suspension tube 21g may be made of relatively small diameter and through which the magnetostrictive member 18 extends. However, the pickup coil 20 of this sensing device 10g' may be wound directly on the suspension tube 21g at the lower end thereof, and positioned adjacent the region of maximum stress S which occurs adjacent the lower end of the magnetostrictive member 18 as shown in FIG. 14. The pickup coil 20 thus requires no separate pickup winding supporting spool. The pick-up winding 20 as applied to the suspension tube 21g, is confined between the outturned flange portion 21b' of the suspension tube 21g and a nonmagnetic and nonconductive collar 24 positioned thereabove and telescoped over the suspension tube 21g. A permanent magnet ring 23 is then telescoped over the suspension tube 21g and seated in abutting relation to the spaced ring 24 as shown in FIG. 14. A resilient expansion ring 37 overlaps the upper end face of the permanent magnet 23, and may be locked to the exterior surface of the suspension tube 21g to maintain the permanent magnet ring 23, spacer ring 24 and pickup coil 20 in fixed and compactly assembled position.

The winding leads 8' extending from the transducer energizing coil 8 may be threaded upwardly and exteriorly between the stationary casing 11d, and the suspension tube 21g and pickup assembly supported thereon, and then through holes in the suspension sleeve 21g and out through the coolant supply tube 16d for connection to the biased high frequency alternating current generator. In the same manner, the leads 20' from the pickup coil 20 may be threaded through the space between the vibrator assembly casing 11d, and the pickup assembly surrounding the suspension sleeve 21g, and thence through holes in the upper end of the suspension tube 21g and out through the coolant supply tube 16d for connection to a pickup circuit having an amplitude indicating instrument, or to the tuning circuit associated with the oscillator generator.

The permanent magnet 23 of the sensing device 10g shown in FIG. 13 and the sensing device 10g' shown in FIG. 14 magnetizes the magnetostrictive member 18 so that magnetic lines of flux flow through the member 18 for substantially the full length thereof. Longitudinal vibrations injected into the magnetostrictive member 18 by, and at the same frequency as, the transducer stack 2 produce a region of high stress S in the member 18 which is adjacent the pickup coil 20. The resulting permeability variations at the region of high stress S in the polarized magnetostrictive member 18, induces an electromotive force in the adjacent pickup coil 20 which is dependent upon the frequency and amplitude of vibration of the magnetostrictive member 18, and which produces a corresponding alternating current in the pickup leads 20', which is measured by the amplitude indicating instrument associated with the pickup circuit, or which automatically manipulates the oscillator circuit of the generator to correspondingly regulate the frequency of its biased alternating output current which flows to the transducer coil 8, and so that the transducer stack 2 and the entire vibrator unit 1 operates at resonance frequency and maximum amplitude.

The vibrator assemblies illustrated in FIGS. 1, 7 and 13 are particularly designed to be supported from a suitable bracket or supporting structure, and their vibrator units 1 may be designed to operate at frequencies in the order of 5 kc. to 50 kc., and dependent upon the work to be performed, such as the quantity of liquid to be vibrated or the machining operation to be done, may be made medium or large in size, and require an input current of 100 watts to 5000 watts or more. Where the vibrator assembly is bracket supported, and not manually held and manipulated, the diametrical size, length and weight of the vibrator assembly is usually of secondary importance.

However, work-performing vibrator assemblies are also extensively used and designed for dental and surgical work, industrial applications or other work, and where the vibrator assembly is held in the hand of an operator and its work tool or element manually manipulated. Since the diametrical size, length and weight of hand manipulated vibrator assemblies is important for convenient hand manipulation of such vibrator assemblies, the hand held assembly should have an exterior diameter of not substantially exceeding one inch, and preferably less, should preferably have a length not exceeding eight to twelve inches and preferably less, and should be compactly made and relatively light in weight. Such hand manipulated vibrator assemblies usually operate at frequencies in the order of 20 kc. or above and require up to 100 or 200 watts of input power or less, and are also preferably equipped with a sensing device which maintains its energized vibrating unit at resonance frequency and maximum amplitude.

To further illustrate the practical application of the sensing devices of this invention to numerous forms of work operations, there is shown in FIGS. 15 and 16 the application of these sensing devices to a series of vibrator units 1 designed to vibrate or cavitate a tank-contained cleaning or treating fluid in which work objects W are immersed. Ultrasonic tank cleaners, as exemplified in FIGS. 15 and 16, comprise a tank 70 having enclosing side walls 70' and a bottom wall 70" which contains a cleaning or treating fluid 70a in which workpieces W are immersed, and which workpieces may be supported adjacent to but in spaced relation to the bottom wall 70" of the tank as by suitable hangers W', which may be conveyorized. The bottom wall 70" or a side wall 70' of the tank is preferably provided with spaced openings through which the end faces 6''' of a series of vibrator units 1 project. Each vibrator unit comprises a transducer 2 and a vibration transmitting component 6f whose vibrated end face 6''' preferably extends through the tank wall, into the tank and in direct contact with the fluid body contained therein. The transducer 2 may be of the piezoelectric, electromechanical or magnetostrictive type, and when the transducer 2 is of the magnetostrictive type, it is energized by an energizing coil 8 wound on a suitable spool 9 through which the transducer 2 projects and which spool is independently supported in stationary position. High frequency alternating current is supplied by a suitable oscillator generator to the winding leads 8' of each energizing coil 8 and to thereby cause each transducer 2, and associated vibrator unit 1 to vibrate in the longitudinal mode and in a direction normal to the bottom wall 70' or other wall of the cleaning tank through which its end face 6''' extends.

Each motion transmitting component 6f, to which one end of the transducer 2 is bonded, should have a longitudinal length corresponding to a one-half wavelength of sound or integral multiples thereof at the frequency of vibration. Each of the vibration transmitting components 6f as shown in FIGS. 15 and 16 presents a conically shaped vibration input section 6' of smaller mass than its conical shaped vibration output section 6", to thereby increase the area of its vibration output face 6'''. A suitable resilient gasket 71 is locked to the rim of each hole in the tank wall, and is in sealing relation to the conical wall of the vibration output section 6" of the vibrator unit to provide a leak-proof seal therebetween, but without dampening the vibrations of its working face 6'''. All of the vibrator units 1 are preferably of similar shape, size and form and are designed to operate at the same resonance frequency and maximum amplitude.

The sensing device associated with each of the vibrator units 1 may correspond to the sensing device 10c shown in FIG. 8 or the sensing device 10d shown in FIG. 9, as heretofore described. The magnetostrictive member or pin 18 forming a part of each sensing device is secured to each vibration transmitting component 6f at the nodal area thereof and at a region of high stress S. The stress at this nodal region may be enhanced by making the intermediate portion of each component 6f of reduced diameter as shown in FIG. 15, with the magnetostrictive pin 18 extending at right angles from the cylindrical intermediate portion, so that radial vibrations are transmitted by the component 6f longitudinally through the magnetostrictive pin 18, and which induces an electromotive force in the pickup coil 20 of the pickup assembly applied thereto.

By associating a sensing device 10c or 10d with the vibration transmitting component 6f of each vibrator unit, any departure from resonance frequency and amplitude of any one of the vibrator units may be separately detected so that the cause of the departure from resonance frequency of vibration of the individual vibration units may be corrected, and to the end that uniform cavitational action is produced in the tank-contained liquid 70a throughout the area of the liquid body. The electromotive force, induced by the magnetostrictive pin 18 into the pickup coil 20 of its associated pickup assembly, is delivered to the pickup leads 20' whose terminals ends are fixed to a pair of contacts 72' for each sensing device as shown in FIG. 16. By providing an adjustable switch arm 73 as shown in FIG. 16, the paired contacts 72', one of which may be grounded, may be placed in circuit with the switch arm 73 and the pickup leads 20f extending from the switch arm 73, so that the pickup leads 20f selectively receive the output power from each sensing device. The output leads 20f are connected to an amplitude indicating meter which indicates the actual frequency and amplitude of vibration of the vibrator unit with which the sensing device is associated. To avoid duplication of pickup assemblies, the pickup assembly of the sensing device 10d may be used, which can be selectively and removably applied in successive order to each of the magnetostrictive pins 18 as fixedly secured to the vibration transmitting component 6f of each vibrator unit 1.

The sensing device arrangement shown in FIGS. 15 and 16 assists the cleaning tank operator in detecting any departure from resonance frequency, and maintaining each energized vibrator unit 1 in vibration at resonance frequency and maximum amplitude, and to thereby assure uniform agitation and cavitation of the tank contained liquid throughout the area of the liquid body.

*Sensing device characteristics*

When the sensing devices made in accordance with this invention, and generally designated by numeral 10 and which incorporate a magnetostrictive member or element generally designated 18, which is one-half wavelength long at the frequency of vibration of the vibration transmitting component of the vibrator unit to which it is attached, as exemplified by the half wavelength magnetostrictive member 18" diagrammatically shown in FIG. 19, the magnetostrictive member is tuned to the resonance frequency of the vibration transmitting component to which it is secured and whose amplitude of vibrations are to be sensed. A tuned magnetostrictive member can be secured to a vibrated part of the work-performing vibrator unit at a loop of longitudinal vibration or a loop of radial vibration of the vibrated part as heretofore explained and shown in FIG. 7.

A half wavelength or tuned magnetostrictive member

18″, regardless of its cross-sectional size and physical length, has the advantage that it imposes a minimal loading on the vibration transmitting component to which it is secured. A tuned magnetostrictive member also results in the production of an electromotive force or signal in the surrounding pickup coil 20 of relatively large magnitude, which corresponds to the resonance frequency and maximum amplitude of vibration of that part of the vibrator unit to which it is secured, and the magnified electromotive force or signal produced in the surrounding pickup coil 20 may be directly employed for operating an amplitude indicating meter, or for automatically tuning the oscillator generator, without the use of a preamplifier, or the use of a relatively small preamplifier, to amplify the electromotive force generated by the pickup coil. Also, when a tuned or half wavelength magnetostrictive member 18″ is used, the pickup coil 20 may be adjusted in position to and from the nodal region of maximum stress S, which occurs at the midsection of the half wavelength magnetostrictive member as indicated in FIG. 19, or its position may be adjusted to and from a loop of longitudinal vibration of the half wavelength magnetostrictive member, which occurs adjacent the upper and lower ends thereof, to thereby vary the strength of the electromotive force generated by the pickup coil 20 from a higher value to a lower value, or vice versa.

When the tuned or half wavelength magnetostrictive member is made in the form of a wire, rod or bar 18, as in the sensing device 10, 10c, 10d and 10g as illustrated in FIGS. 2, 8, 9, 13 and 14; or in the form of a magnetostrictive bar 18a as in the sensing device 10a illustrated in FIGS. 4 and 5; or in the form of a magnetostrictive tube 18b as in the sensing device 10g illustrated in FIG. 6; the magnetostrictive member 18, 18a and 18b will embrace the desirable attributes of a half wavelength and tuned magnetostrictive member as above explained. However, when a tuned or half wavelength magnetostrictive wire, rod, bar or tube is used as a part of the sensing device, it may have a structural length which is three or more inches long at frequency ranges below 30 kc., and thus may be too long for convenient association with the vibrator assembly, or for association with the vibrator unit and motion transmitting component thereof whose frequency and amplitude of vibration are to be sensed.

Where a tuned or half wavelength magnetostrictive member or element cannot be conveniently used, the magnetostrictive member may be made less than one-half wavelength long but more than one-quarter wavelength long, such as the magnetostrictive member 18′ exemplified in FIG. 18; or can be made less than one-fourth wavelength long as is the magnetostrictive member 18 exemplified in FIG. 17. A magnetostrictive member 18′ which is less than a half wavelength long, or a magnetostrictive member 18 which is less than a quarter wavelength long, is nonresonant at the frequency of vibration, and imposes a load on the component or part of the vibrator unit to which it is secured. To hold such loading to a minimum, the nonresonant magnetostrictive member or element should desirably be small in mass, and have the smallest practical length and cross-section, sufficient only to accommodate the surrounding pickup assembly.

A non-resonant magnetostrictive member, such as member 18′ or 18, as illustrated in FIGS. 18 and 17, exhibits a region of maximum stress S slightly above its point of attachment to the vibration transmitting component 6 of the vibrator unit, and the pickup coil 20 should be positioned adjacent this region of maximum stress. Magnetostrictive members 18′ and 18 which are non-resonant at the frequencies at which they are vibrated by the vibration transmitting component of the vibrator unit to which they are secured, can be selectively applied to vibration transmitting components which vibrate below 30 kc. and as low as 5 kc. or even below. When a non-resonant magnetostrictive member is vibrated by the part of the vibrator unit to which it is secured, the electromotive force induced in the surrounding pickup coil 20 is relatively low in value, so that its power output fed into its output leads 20′ may not be of sufficient magnitude and may require preamplification in order to operate an amplitude indicating meter, or to automatically adjust the tuning means of the generator circuit to the resonance frequency of the vibrator unit as illustrated in FIGS. 20, 21 and 22.

However, nonresonant magnetostrictive members or elements which are less than one-half wavelength long, should nevertheless have a sufficient structural length to accommodate the pickup assembly of the sensing device as telescoped thereover, and for this purpose can be made less than two inches in longitudinal length, and even less than one inch in length. Thus, the magnetostrictive wire, rod or bar 18 in FIGS. 2, 8, 9 and 13; the magnetostrictive bar 18a shown in FIGS. 4 and 5; and the magnetostrictive tube 18b shown in FIG 6, may be made less than one-half wavelength long and thus nonresonant at the operating frequency; and such lengths are preferably used where a shortened and nonresonant magnetostrictive member or element can best accommodate the vibrator assembly, vibrator unit or motion transmitting component of the vibrator unit, with which it is associated. Since the pickup assembly of the sensing device need not be substantially more than one inch in longitudinal length, the magnetostrictive member associated therewith may have an approximately corresponding length.

The wavelength of sound traveling longitudinally through the material of a magnetostrictive member or element is dependent upon the acoustical properties of the material of the member or element, and the frequency at which it is vibrated. For example, assuming that a sound wave will travel longitudinally through a selected magnetostrictive material at a speed of 180,000 inches per second, as an approximate average; the wavelength may then be computed by dividing the speed of sound in inches per second traveling through the material of the member, by the frequency per second at which the magnetostrictive member is vibrated. Assuming that a sound or acoustical wave travels longitudinally through the material of a magnetostrictive member at the rate of 180,000 inches per second, fractional wavelengths of magnetostrictive members vibrating at different frequencies as measured in inches may be computed, as in the illustrative tabulation below.

| Frequency of Vibration in Kilocycles | ½ Wave Length | ¼ Wave Length | 3⁄16 Wave Length | ⅛ Wave Length | 3⁄32 Wave Length | 1⁄16 Wave Length | 1⁄32 Wave Length |
|---|---|---|---|---|---|---|---|
| 60 | 1.5″ | .75″ | .56″ | | | | |
| 50 | 1.8″ | .90″ | .675″ | | | | |
| 40 | 2.25″ | 1.125″ | .84″ | .56″ | | | |
| 30 | 3.0″ | 1.5″ | 1.12″ | .75″ | | | |
| 25 | 3.6″ | 1.8″ | 1.35″ | .90″ | | | |
| 20 | 4.5″ | 2.25″ | | 1.125″ | .84″ | .56″ | |
| 15 | 6.0″ | | | 1.5″ | 1.12″ | .75″ | |
| 10 | 9.0″ | | | 2.25″ | | 1.12″ | |
| 5 | 18.0″ | | | | | 2.25″ | 1.125 |

When the work-performing vibrator unit vibrates at frequencies of 50 kc. and above, the magnetostrictive member or element in the form of a wire, rod, bar or tube attached at one end thereof to the vibration transmitting component of the vibrator unit, would have a structural length of approximately 1.8 inches when made one-half wavelength long, as indicated in the above tabulation, and which half wavelength member or element may be sufficiently short in structural length to be conveniently accommodated by the vibrator unit 1 and vibrator assembly with which it is associated.

However, when the vibrator unit vibrates at about 40 kc. or below, a half wavelength magnetostrictive member or element in the form of a wire, rod, bar or tube secured at one end thereof to a vibration transmitting component of the vibrator unit, may be too long to be accommodated by the vibrator assembly and the vibrator unit to which it is attached, and can then be made less than one-half wavelength long, and thus nonresonant at the frequency of vibration. However, the nonresonant magnetostrictive member or element when formed as a wire, rod, bar or tube, should be more than one-fourth wavelength or less than one-fourth wavelength long, since vibrations induced in a one-fourth wavelength magnetostrictive member or element produce a region of such high stress as to subject the member or element to possible fracture.

Since the nonresonant member or element in the form of a wire, rod, bar or tube, imposes undesirable loading on the vibrator unit to which it is attached, which may cause a variation in its resonance frequency and maximum amplitude, the nonresonant member or element should accordingly possess the smallest practical mass, with resultant minimal loading of the vibrator unit, by making its cross-section sufficient only to achieve adequate structural strength, and by making its longitudinal length as short as possible, and sufficient only to acccommodate a miniature but adequate pickup assembly as telescoped thereover, and which longitudinal length may be in the order of approximately one inch.

As may be interpolated from the above tabulation, a magnetostrictive member or element in the form of a wire, rod, bar or tube vibrated at about 40 kc. may be approximately three-eighths of a wavelength long; a magnetostrictive member or element vibrated at about 30 kc. may be in the order of three-sixteenths to one-eighth of a wavelength long; a magnetostrictive member or element vibrated at approximately 25 kc. may be approximately one-eighth of a wavelength long; a magnetostrictive member or element vibrated about 20 kc. may be in the order of one-eighth to three thirty-seconds of a wavelength long; a magnetostrictive member or element vibrated at about 15 kc. may be in the order of three thirty-seconds to one-sixteenth of a wavelength long; a magnetostrictive member or element vibrated at about 10 kc. may be in the order of approximately one-sixteenth to one thirty-second of a wavelength long; and a magnetostrictive member or element vibrated at 5 kc. may be less than one thirty-second of a wavelength long. Thus, nonresonant magnetostrictive members or elements may be selectively used which have a structural length sufficient to effectively cooperate with a pickup assembly telescoped thereover, and which pickup assembly may have a longitudinal length which is approximately only one inch or less, and which also best accommodates various vibrator assemblies and vibrator units operating over a wide range of frequencies.

The selected nonresonant magnetostrictive member 18, 18', 18a or 18b which is less than one-half wavelength long, must not only be of sufficient structural length to accommodate the pickup assembly, but must also be sufficiently short to accommodate the vibrator unit and vibrator assembly with which it is associated; and in addition must be structurally rigid and strong to resist fracture and meet permissible peak stress requirements, sensitively responsive to vibration, strongly polarizable, and possess the ability to induce a relatively strong signal in the surrounding pickup coil 20.

The magnitude of the electromotive force induced in the pickup coil 20, is dependent upon the degree of alteration of the magnetic field established in the region of maximum stress S of the polarized magnetostrictive member in response to the transmission of vibrational energy thereto, and at which region of maximum stress the pickup coil 20 should desirably be located. The pickup coil 20 may be adjusted to proper inductance, which will result in the generation of maximum electromotive force, by applying a proper number of turns of pickup wire to the winding supporting tube or spool during assembly manufacture of the pickup coil as determined by available inductance measuring instruments. The tube or spool which supports the pickup coil should be made of a nonmagnetic material which does not impede the passage of magnetic flux between the pickup coil and the magnetostrictive member projecting axially therethrough, and when the pickup winding supporting spool or tube is thus made, the tubular body of the spool or tube may have a bore which loosely receives the magnetostrictive member or element, as illustrated in the accompanying drawings. The permanent magnet ring 23 is preferably spaced from the pickup coil 20, as by a nonmagnetic and nonconductive spacer ring 24, with the permanent magnet ring 23 and spacer ring 24 in axial alignment with the pickup coil 20. The magnetic flux field produced by the permanent magnet travels between and around the permanent magnet ring and pickup coil and longitudinally through the magnetostrictive member or element to thereby polarize the member or element of the sensing device.

The sensing devices of this invention, as heretofore described, are particularly designed for association with an oscillator generator and tuning circuit and which operates to adjust the oscillator generator into frequency match with the resonance frequency of the work-performing vibrator unit and thereby assure maximum work performance by the vibrator unit. Where heavy duty vibrator units are employed, which require a high power input to the transducer winding 8 as in the order of 200 watts to 5000 watts or higher, the oscillator generator preferably embraces two or more triodes which convert normal line current into the desired high frequency alternating current used to energize the transducer winding. However, where relatively low power is required to energize the transducer winding 8 as in the nature of 200 watts or below, the generator oscillator may embrace transistors which convert normal line current into high frequency alternating current to power the transducer winding.

FIG. 20 discloses a circuit diagram 75 which embraces an oscillator generator circuit having triodes 77 for converting line current into high frequency alternating current which powers the transducer winding, in combination with a sensing circuit associated with one of the sensing devices of this invention, and which operates to automatically tune the generator oscillator circuit to the resonance frequency of vibration of the vibrator unit, and whose energizing winding 8 is supplied with the high frequency alternating current supplied by the oscillator circuit of the generator. As shown in FIG. 20, electrical power, such as normal 115 volt 60 cycle alternating line current, is supplied by power leads 75a through an on-off switch 75b to the power intake lines 75c of a rectifier and filter 76 of the generator circuit. The minus side of the high voltage direct current output from rectifier 76 is transmitted by line 76a, which is grounded at 76b, by branch lines 76c to the cathodes c of two or more triode oscillators 77. The plus side of the direct current produced by the rectifier and filter 76, is connected by tap conductor 76d to the center of the primary winding 78' of a transformer 78, and the lead ends 78a of the primary winding 78' of the transformer 78 are in turn connected to the anodes a of the triode oscillators 77. The secondary winding 78" of the transformer 78 is connected in circuit to the leads 8a and 8b of the transducer winding 8, with a blocking capacitor 79 inserted in transducer winding lead 8a in a position between the secondary winding 78" of the transformer 78 and the transducer winding 8.

To provide a direct current bias for the transducer winding 8, normal line current, such as 115 volt, 60 cycle alternating current, may be tapped as by conductors 80a and 80b which are connected to the primary winding 80' of a second transformer 80. The end leads of the secondary winding 80" of the second transformer 80 are connected to a pair of rectifiers 81. The plus D.C. output lines 81a from the rectifiers 81 are joined together and continued as line 81a' for connection to the winding lead 8b of the transducer winding 8, and with the lead winding 8b grounded as at 8c, as shown in FIG. 20. The secondary winding 80" of the second transformer 80 is centrally tapped by a plus direct current line 81b and then connected to a pair of chokes 82a-82b linked in series. The output line 82c of the second choke 82b is connected to the lead line 8a of the transformer winding 8, and between the transformer winding 8 and the blocking capacitor 79. A second capacitor 83 is connected to the continuation output line 81a' extending from the rectifiers 81, to that section of the tap line 81b which extends between the first choke 82a and second choke 82b, and whose function is to reduce the ripple of the D.C. current. The blocking capacitor 79, operating in conjunction with the chokes 82a and 82b and the second capacitor 83 connected therebetween, prevents the flow of D.C. current from line 82a to the main transformer 78, so that biasing direct current flows from the rectifiers 81 only into the transducer winding 8.

The small but nevertheless measurable electromotive force or voltage induced in the pickup coil 20 by the polarized and vibrated magnetostrictive element 18 of the sensing device (and which may be polarized by a permanent magnet 23 as heretofore explained, and diagrammatically illustrated in FIG. 20) is fed into the input of amplifier 85 via the leads 20'. After grounding one of the pickup leads 20' as at 84, the pickup leads 20' are connected to a preamplifier 85 which magnifies the electromotive force or electrical power generated by the pickup coil 20, as induced by the vibration of the polarized magnetostrictive element 18. The magnified output current from the preamplifier 85, is fed into the preamplifier output lines 85a and 85b which are connected to the ends of the primary winding 86' of a third transformer 86 which closes the regenerative loop required for automatic frequency control.

The ends of the secondary winding 86" of the transformer 86, which forms a part of the feedback circuit, are connected by lines 86a to the grids g of the triode oscillators 77, as shown in FIG. 20. The secondary winding 86" of the transformer 86 is also center tapped by line 86b and which is in turn connected by line 87b to the branch input lines 76c which carry the current coming from the cathodes c of the triodes 77. A resistor 87 and associated capacitor 87a are connected in parallel to tap line 86b and line 87b and serve to generate a negative voltage so that the grids g of the triodes 77 have a lower voltage than the cathodes c of the triodes.

A voltmeter 88 may be connected by lines 88b across the output lines 85a-85b of the preamplifier 85, and the voltmeter 88 may be instrumented and provided with an amplitude indicator 88a, which indicates the amplitude of vibration of the magnetostrictive element 18 of the sensing device and the vibration transmitting component 6 of the vibrator unit 1 to which the sensing element 18 is connected or associated. If desired, a remote control switch 89 may be provided for cutting off the power to the primary winding 86' of the transformer 86 of the tuning circuit.

The sensing and tuning circuits above described influence the operation of the triodes 77 forming a part of a regeneration circuit, so that the biased high frequency alternating current supplied to the transducer winding 8 is tuned to match the mechanical resonance frequency of vibration of the vibrator unit 1. This relatively simple sensing circuit is designed for association with any one of the sensing devices heretofore described, and operates to effectively and reliably tune the high frequency alternating current output from the oscillator circuit as supplied to the transducer winding 8. Tuning of the oscillator circuit into frequency match with the resonance frequency of the vibrator unit is automatically assured without the attention of the operator while using the vibrator unit in performing useful work. However, as shown in FIG. 20, and above explained, a voltmeter 88 having a calibrated amplitude indicating instrument 88a associated therewith, and connected to the output lines 85a and 85b of the preamplifier 85 of the sensing circuit, may be additionally provided. It will also be appreciated that the sensing circuit and associated voltmeter 88 and amplitude indicator 88a may be operated separately, without automatic tuning tiein with the oscillator circuit, and in which case the generator circuit (after adding a frequency tunable adjustable oscillator) would be manually tuned by the operator in accordance with the amplitude indications on the amplitude indicator instrument 88a.

FIG. 21 is circuit diagram designated 90 which illustrates a transistorized generator circuit, sensing circuit and self-tuning circuit combination which can be used where transistor oscillators generate sufficient high frequency alternating current power for the transducer winding 8 to efficiently vibrate the work-performing vibrator unit 1 at resonance frequency. Such transistor oscillators are now being made which will convert as much as 200 watts of input line current into transducer energizing high frequency alternating current, and continuing improvement of transistor oscillators may make them capable of efficiently generating even high input power for the transducer. Transistorized oscillator circuits are simpler, less complicated, and less costly to manufacture than tube type oscillator circuits, and are preferably used where the power demand can be satisfied by a transistorized oscillator generator.

The transistorized generator circuit, as shown in FIG. 21, receives line current, such as 115 volt, 60 cycle alternating current, from the line current input lines 90a, and which preferably has an on-off switch 90b associated therewith which is connected to the power input leads 90c of a rectifier and filter 91. The plus D.C. output line 91a from the rectifier and the filter 91, after grounding as at 91a', has a protective resistor 92 connected in series thereto, and which resistor 92 is connected by branch input lines 92a to the emitters e of two or more transistors 93. The collectors c of the transistors 93 are connected to the winding leads 8a and 8b of the transducer energizing winding 8 as illustrated in FIG. 21. The transducer winding 8 is supplied by winding leads 8a and 8b with high frequency alternating current at a frequency which will cause the transducer 2 and the entire vibrator unit 1 to vibrate at resonance frequency and maximum amplitude. The transducer energizing winding 8 is centrally tapped by a tap conductor 94a which is connected to one side of a bypass capacitor 94, and to one end of polarizing coil 95 and the other side of the bypass capacitor 94 is connected by line 94b to the negative D.C. line 91b extending from the rectifier and filter 91.

To supply a polarizing field for the transducer 2, the negative lead 91b from the rectifier and filter 91 is also connected in series to a choke 96 which is in turn connected to the polarizing coil 95 which supplies the biasing field to the transducer 8. The other end of the polarizing coil 95 is connected by line 95b to the center tap lead 94a of the transducer energizing coil 8.

The generator-oscillator circuit as above described establishes through the windings 8 and 95 a biased high frequency alternating magnetic field through the transducer 2 for substantially the full length thereof, and which causes the half wavelength transducer 2 to vibrate in the longitudinal mode. The vibrated transducer 2 injects its vibrations longitudinally through the connecting body 4 and tool or tool holder 6 of the vibrator unit, and in a manner to cause the entire vibrator unit 1 as well as the vibration transmitting component or tool holder 6 to vibrate at resonance frequency and maximum amplitude. To automatically maintain the generator oscillator circuit and the associated transducer windings 8 and 95 in frequency match with the resonance frequency and maximum amplitude of vibration of the vibrator unit 1, a sensing circuit is provided as shown in FIG. 21. The magnetostrictive member or element 18, fixed to the vibration transmitting component 6 of the vibrator unit 1 to a loop of longitudinal vibration or a loop of radial vibration thereof, is suitably polarized as by a permanent magnet 23. The polarized magnetostrictive member 18, as vibrated by the vibration transmitting component 6 of the vibrator unit, induces in the pickup coil 20 of the pickup assembly of the sensing device a small but nevertheless measureable voltage which is supplied to the output leads 20' of the pickup coil 20. The power flow through the output leads 20' of the pickup coil 20 is preferably amplified by a preamplifier 97 which may be transistorized to reduce its size. The output leads 97a and 97b from the preamplifier 97 are connected to the ends of the primary winding 98' of a transformer 98 which forms a part of the feedback circuit. The preamplifier 97 draws its power from the output of the rectifier and filter 91 via line 91b and 97e, and line 91 and 97d.

The secondary winding 98" of the transformer 98 of the feedback circuit has its ends connected by conductors 98a to the base electrodes b of the push-pull transistor amplifiers 93. A pair of voltage dividing resistors 100a and 100b are connected in series to the output lines 91a and 91b of the rectifier and filter 91. A protective resistor 99 is connected between the voltage dividing resistors 100a and 100b and connected by tap line 99b to the center of the secondary winding 98' of the transformer 98 which forms a part of this regenerative circuit. Thus, the current flowing from the pickup coil 20 of the sensing device through its output leads 20', as amplified by the transistor amplifier 97, which is in turn connected through the transformer 98 to the base electrodes b of the transistors 93, controls the conductivity of the transistors 93, and operates to automatically adjust the frequency of the alternating current supplied to the transducer winding 8 into frequency match with the resonance frequency of vibration of the vibrator unit 1.

A voltmeter 101, instrumented to provide an amplitude indicator 102, may be connected by lines 101a and 101b to the preamplifier output lines 97a and 97b. One end of the primary winding 98' of the tuning circuit transformer 98 is connected to line 101b leading to the voltmeter 101. By this circuit, a readable indication can be obtained of the amplitude of vibration of the magnetostrictive element 18 and the vibration transmitting component 6 of the vibrator unit 1 with which it is associated. If desired, on-off switch 97c may be positioned between the preamplifier output line 97b and the line 101b leading to the voltmeter 101.

Those parts 94, 95 and 96 of the transistorized generator circuit shown in FIG. 21, may be deleted by using a permanent magnet 105 and associated polarizing coil 106 as shown in FIGS. 22 and 23, and which would permit elimination of the choke 96, direct current biasing coil 95, and blocking condenser 94 from the circuit shown in FIG. 21. In the modification shown in FIGS. 22 and 23, a permanent magnet 105 is combined with pole pieces 105a and 105b whose ends are positioned in substantially abutting relation to the opposite ends of the transducer 2, and preferably the pole pieces 105a and 105b in actual practice would lightly touch the opposite ends of the transducer 2. The energizing winding 8 is wound around the transducer 2 and between the pole pieces 105a and 105b of the permanent magnet 105, with the ends of the transducer energizing coil 8 connected by the winding leads 8a and 8b to the collectors c of the transistors 93, as shown at the left-hand side of FIG. 21.

A direct current winding 106 may be wound around the transducer energizing coil 8, with one end 106b, of the coil 106 connected to the minus D.C. current output line 91b etxending from the rectifier and filter 91. The other end of the coil 106 is connected by line 106a to the winding lead 8b of the transducer energizing coil. The superimposed winding 106, operating in conjunction with the permanent magnet 105, polarizes the transducer 2 for substantially the full length thereof, and thus serves to bias the high frequency alternating magnetic field flowing longitudinally through the transducer 2, and which field is circulated through the pole pieces 105a and 105b and the permanent magnet 105 extending therebetween. The coils 8 and 106 shown in FIGS. 21 and 22, and only schematically drawn, are in surrounding relation to the transducer stack 2. For improved efficiency it is desirable that the individual coils 8 and 106 cover about seventy five percent of the length of the transducer stack 2, as shown in FIGS. 22 and 23.

By modifying the right-hand side of the generator circuit as shown in FIG. 21 in the respects indicated in FIGS. 22 and 23, certain components of the oscillator circuit as shown in the right-hand side of FIG. 21 may be dispensed with, and a highly effective biased high frequency magnetic field is supplied to the transducer which sets it into longitudinal vibration. In the modified circuit shown in FIGS. 22 and 23, the sensing circuit and tuning circuit, and that part of the oscillator generator circuit positioned on the left-hand side of FIG. 21, would not be otherwise modified.

The transistorized sensing and feedback circuits disclosed in FIGS. 21, 22 and 23 and above described, influence the operation of the transistors 93 forming a part of the generator circuit, so that the high frequency alternating current supplied to the transducer winding 8 is tuned to match the known resonance frequency of vibration of the vibrator unit 1. This relatively simple sensing circuit is designed for association with any one of the sensing devices heretofore described, and operates to effectively and reliably tune the high frequency alternating current output from the oscillator circuit as supplied to the transducer winding 8. Tuning of the oscillator circuit into frequency match with the resonance frequency of the vibrator unit is automatically assured without the attention of the operator while using the vibrator unit in performing useful work. However, as shown in FIG. 21, and above explained, a voltmeter 101 having a calibrated amplitude indicating instrument 102 associated therewith, and connected to the output lines 97a and 97b of the preamplifier 97 of the sensing circuit, may be additionally provided. It will also be appreciated that the sensing circuit and associated voltmeter 101 and amplitude indicator 102 may be operated separately, without automatic tuning tie-in with the oscillator circuit, and in which case the generator oscillator circuit, supplemented by a tunable oscillator, would be manually tuned by the operator in accordance with the amplitude indications on the amplitude indicator instrument 102.

By following the teachings of this invention, sensing devices, as exemplified in the accompanying drawings, and heretofore described, can be designed and adapted to numerous and various forms of vibrator assemblies and work-performing vibrator units, and which will accommodate substantially all structural and operating conditions. Selected sensing devices made in accordance with this invention can be applied to vibrator units at locations which do not interfere with the normal manipulation or operation of the work-performing vibrator unit to which it is applied, and which does not interfere with or obstruct the ready insertion and reapplication of the vibrator units from their vibrator assemblies, even though the vibrator units are rotated as well as longiudinally vibrated. These sensing deivces are particularly adapted to be joined in circuit with oscillator generator or regenerative circuits, to thereby automatically maintain the oscillator circuit in frequency match with the resonance frequency of vibration of the vibrator unit. These sensing devices and associated circuits, may assume various forms which best accommodate the particular hand-held or bracket supported vibrator assembly, and permits the operator to give his whole and undivided attention to the performance of useful work, under conditions of peak working efficiency of the vibrator unit without tuning attention.

While certain novel features of this invention have been disclosed herein and are pointed out in the claims, it will be understood that various omissions, substitutions and changes may be made by those skilled in the art without departing from the spirit of this invention.

What is claimed is:

1. A device for sensing variations in the frequency and amplitude of vibration of a work performing vibrator unit which presents an electromechanical transducer component and a work tool component designed to perform useful work which is rigidly joined to said transducer component by a vibration transmitting component and which together provide a vibrator unit designed to vibrate at a predetermined resonance frequency when the transducer component is energized by an alternating field of corresponding frequency; said device including, an elongated magnetostrictive member presenting a free end and having means at the opposite end thereof for rigidly securing said member to a component of said work performing vibrator unit in the region of a loop of vibration thereof and whereby said member is vibrated at a frequency and amplitude which substantially corresponds to the frequency and amplitude of vibration of that region of the vibrator unit at which said member is fixed, said magnetostrictive member having a longitudinal length which is not more than one-half wave length of sound traveling through said member when mechanically vibrated by said unit at the resonance frequency for which the unit is designed, said magnetostrictive member having a relatively small cross-sectional area and relatively small mass as compared to the component of the vibrator unit to which it is secured and whereby said member does not materially alter the normal resonance freqeuncy or amplitude of vibration of such component, a pick-up assembly telescoped over said magnetostrictive element and which includes a pickup coil surrounding a region of maximum stress in said member when vibrated, means for polarizing said magnetostrictive member, and a housing positioned in spaced relation to said vibrator unit for containing and supporting said pickup coil in telescoped position with respect to said magnetostrictive member, said pickup coil being operative to generate an electromotive force, as induced therein by the vibrations of said polarized magnetostrictive member, whose magnitude varies in accordance with the variations in amplitude of vibration of the vibrator unit at the region thereof at which said magnetostrictive member is secured thereto.

2. A device according to claim 1, and wherein the longitudinal length of said magnetostrictive member is less than one half wave length but more than one quarter wave length of sound traveling through said member when mechanically vibrated by said unit at the resonance frequency for which the unit is designed.

3. A device according to claim 1, and wherein the longitudinal length of said magnetostrictive member is less than one quarter wave length of sound traveling through said member when mechanically vibrated by said unit at the resonance frequency for which the unit is designed.

4. A device according to claim 1, and wherein said elongated magnetostrictive member is in the form of a solid rod of relatively small cross sectional area and relatively small mass as compared to the component of the vibrator unit to which it is secured.

5. A device according to claim 1, and wherein said elongated magnetostrictive member is in the form of a thin walled tube of relatively small cross sectional area and relatively small mass as compared to the component of the vibrator unit to which it is secured.

6. A device as defined in claim 1, and wherein said polarizing means comprises a permanent magnet ring surrounding said magnetostrictive member and in spaced relation to said pick-up coil and which is contained within and supported by said housing.

7. A device as defined in claim 1, and wherein said polarizing means comprises a permanent magnet ring positioned in surrounding relation to said magnetostrictive member adjacent the free end thereof, and which is operative to polarize substantially the entire length of said magnetostrictive member, and which device further includes a nonmagnetic and nonconductive spacer ring positioned in surrounding relation to said magnetostrictive member and between said pickup coil and permanent magnet ring, and means associated with said housing for securing said pickup coil, spacer ring and permanent magnet ring compactly stacked in said housing.

8. A device as defined in claim 1 which includes means for supporting said housing in stationary and nonvibratory position and independent of the component of the vibrator unit to which said magnetostrictive member is secured.

9. A device as defined in claim 1, which also includes means activated by the electromotive force generated by said pickup coil for indicating the variations in said electromotive force in terms of variations in the amplitude of vibration of said vibrator unit at the area thereof at which said magnetostrictive member is secured.

10. A device for sensing variations in the frequency and amplitude of vibration of a work performing vibrator unit which presents an electromechanical transducer component and a work tool component designed to perform useful work which is rigidly joined to said transducer component by a vibration transmitting component and which together provide a vibrator unit designed to vibrate at a predetermined resonance frequency when the transducer component is energized by an alternating field of corresponding frequency; said device including, an elongated magnetostrictive member presenting a free end and having means at the opposite end thereof for rigidly securing said member to a component of said work performing vibrator unit in the region of a loop of vibration thereof and whereby said member is vibrated at a frequency and amplitude which substantially corresponds to the frequency and amplitude of vibration of that region of the vibrator unit at which said member is fixed, said magnetostrictive member having a longitudinal length which is not more than one-half wave length of sound traveling through said member when mechanically vibrated by said unit at the resonance frequency for which the unit is designed, a pickup assembly telescoped over said magetostrictive element and which includes a pick-up coil surrounding a region of maximum stress in said member when vibrated, a permanent magnet ring positioned in surrounding relation to said magnetostrictive member and adjacent the free end thereof and which is operative to polarize substantially the entire length of said magnetostrictive member, a nonmagnetic and nonconductive spacer ring in surrounding relation to said magnetostrictive member and positioned between said pickup coil and permanent magnet ring, and a housing positioned in spaced relation to said vibrator unit for containing and supporting said pickup coil, permanent magnet ring and spacer ring in telescoped position with respect to said magnetostrictive member, and means adjacent the free end of said magnetostrictive member for removably suspending said housing and said pickup coil, permanent magnet ring and spacer ring contained thereon from said magnetostrictive member; said magnetostrictive member and pickup assembly having a relatively small mass as compared to the component of the vibrator unit to which said member is secured and whereby said member of pickup assembly do not materially alter the normal resonance frequency or amplitude of vibration of such component; said pickup coil being operative to generate an electromotive force, as induced therein by the vibrations of said polarized magnetostrictive member, whose magnitude varies in accordance with the variations in amplitude of vibration of the vibrator unit at the region thereof at which said magnetostrictive member is secured thereto.

11. A vibrator assembly including in combination; a work performing vibrator unit which presents an electromechanical transducer component and a work tool component designed to perform useful work which is rigidly joined to said transducer component by a vibration transmitting component and which together provide a vibrator unit designed to vibrate at a predetermined resonance frequency when the transducer component is energized by an alternating field of corresponding frequency, a stationary casing containing said transducer component and at least a portion of the vibration transmitting component of said vibrator unit, means associated with said casing for supporting said vibrator unit adjacent a node of longitudinal vibration thereof, and a high frequency alternating current winding contained within and supported by said casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency and amplitude of vibration of said work performing vibrator unit when vibrated; said device including an elongated magnetostrictive member presenting a free end having means at the opposite end thereof for rigidly securing said member to a component of said work performing vibrator unit in the region of a loop of vibration thereof and whereby said member is vibrated at a frequency and amplitude which substantially correspond to the frequency and amplitude of vibration of that region of the vibrator unit at which said member is fixed, said magnetostrictive member having a longitudinal length which is not more than one-half wave length of sound traveling through said member when mechanically vibrated by said unit at the resonance frequency for which the unit is designed, said magnetostrictive member having a relatively small cross-sectional area and relatively small mass as compared to the component of the vibrator unit to which it is secured and whereby said member does not materially alter the normal resonance frequency or amplitude of vibration of such component, a pickup assembly telescoped over said magnetostrictive member and which includes a pickup coil surrounding a region of maximum stress in said member when vibrated, means for polarizing said magnetostrictive member, and a housing positioned in spaced relation to said vibrator unit for containing and supporting said pickup coil in telescoped position with respect to said magnetostrictive member, means associated with said casing for supporting said pickup assembly in telescoped position with respect to said magnetostrictive member and in a manner independently of said magnetostrictive member and the component of said work performing vibrator unit with which it is associated; said pickup coil being operative to generate an electromotive force, as induced therein by the vibrations of said polarized magnetostrictive member, whose magnitude varies in accordance with the variations in amplitude of vibration of the vibrator unit at the region thereof at which said magnetostrictive member is secured thereto.

12. A device as defined in claim 11, and wherein said polarizing means comprises a permanent magnet ring surrounding said magnetostrictive member and in spaced relation to said pickup coil and which is contained within and supported by said housing.

13. A device as defined in claim 11, and wherein said polarizing means comprises a permanent magnet ring positioned in surrounding relation to said magnetostrictive member and adjacent the free end thereof and which is operative to polarize substantially the entire length of said magnetostrictive member, a nonmagnetic and nonconductive spacer ring in surrounding relation to said magnetostrictive member and positioned between said pickup coil and permanent magnet ring, and means associated with said housing for securing said pickup coil, spacer ring and permanent magnet ring compactly stacked in said housing.

14. A vibrator assembly according to claim 11, and wherein the elongated magnetostrictive member of said sensing device is fixed at one end thereof to the vibration transmitting component of said vibrator unit and has its longitudinal axis extending in the direction of vibration of that region of the vibration transmitting component to which it is secured.

15. A vibrator assembly according to claims 11 and 13, and wherein the elongated magnetostrictive member of said sensing device is in the form of a thin walled tube having a relatively small cross-sectional area and relatively small mass as compared to the vibration transmitting component to which it is secured.

16. A vibrator assembly according to claims 11 and 12, and wherein the elongated magnetostrictive member of said sensing device is fixed at one end thereof to the free end of the transducer component of said vibrator unit and has its longitudinal axis extending in the direction of vibration of the free end of the transducer component to which it is secured.

17. A vibrator assembly as defined in claim 11, and which further includes a high frequency generator circuit for energizing said winding, and means connected in circuit with said pickup coil and generator circuit for automatically tuning said generator circuit into frequency match with the resonant frequency of vibration of said vibrator unit during working vibration thereof.

18. A vibrator assembly including in combination; a work performing vibrator unit which presents an electromechanical transducer component and a work tool component designed to perform useful work which is rigidly joined to said transducer component by a vibration transmitting component and which together provide a vibrator unit designed to vibrate at a predetermined resonance frequency when the transducer component is energized by an alternating field of corresponding frequency, a stationary casing containing said transducer component and at least a portion of the vibration transmitting component of said vibrator unit, means associated with said casing for supporting said vibrator unit adjacent a node of longitudinal vibration thereof, a high frequency alternating current winding contained within said casing and positioned in surrounding relation to said transducer component and operative when energized to establish an alternating magnetic field in surrounding relation to said transducer component whose frequency substantially corresponds to the resonance frequency of vibration of said work performing vibrator unit; and means for supporting and suspending said winding from said casing; and a device for sensing variations in the frequency and amplitude of vibration of said work performing vibrator unit when vibrated, said device including an elongated magnetostrictive member presenting a free end and having means at the opposite end thereof for rigidly securing said magnetostrictive member to the free end of said transducer component and whereby said member is vibrated at a frequency and amplitude of vibration of that region of the transducer component at which said member is fixed, said magnetostrictive member having a longitudinal length which is less than one-half wave length of sound traveling through said member when mechanically vibrated by said unit at the resonance frequency for which the unit is designed, said magnetostrictive member having a relatively small cross-sectional area and a relatively small mass as compared to the transducer component to which it is secured and whereby said member does not materially alter the normal resonance frequency or amplitude of vibration of said transducer component, a pickup assembly telescoped over said magnetostrictive member which includes a pick-up coil surrounding a region of maximum stress in said member when vibrated, a means for polarizing said magnetostrictive member, a suspension means supporting said pickup coil within said casing, and a nonmagnetic and nonconductive flux shielding collar interposed between said energizing winding and pickup coil; said pickup coil being operative to generate an electromotive force, as induced therein by the vibrations of said polarized magnetostrictive member, whose magnitude varies in accordance with the variations in amplitude of vibration of the vibrator unit at the region thereof at which said magnetostrictive member is secured thereto.

19. A vibrator assembly as defined in claim 18, and wherein said polarizing means comprises a permanent magnet ring positioned in surrounding relation to said magnetostrictive member and adjacent the free end thereof, and which is operative to polarize substantially the entire length of said magnetostrictive member, and a nonmagnetic and nonconductive spacer ring in surrounding relation to said magnetostrictive member and positioned between said pickup coil and permanent magnet ring, said pickup coil, spacer ring and permanent magnet ring being supported in surrounding relation to said magnetostrictive member by a tubular extension of said winding supporting means.

20. A vibrator assembly as defined in claim 18, and wherein said elongated magnetostrictive member presents its longitudinal axis in axial alignment with the longitudinal axis of said transducer component, and wherein said means for supporting said vibrator unit includes a bearing assembly operatively connected to said vibration transmitting component and said casing which rotatably supports said work performing vibrator unit and magnetostrictive member fixed to the transducer component thereof.

References Cited by the Examiner

UNITED STATES PATENTS

| | | | |
|---|---|---|---|
| 2,269,760 | 1/1942 | Eldredge | 310—26 |
| 2,319,219 | 5/1943 | Draper et al. | 310—26 |
| 2,402,544 | 6/1946 | Foulds | 310—26 X |
| 2,490,273 | 12/1949 | Kean | 310—26 |
| 2,806,328 | 9/1957 | Bradfield | 310—26 X |
| 2,826,706 | 3/1958 | Sackett | 310—26 |
| 2,830,165 | 4/1958 | Carlin | 219—26 |
| 2,917,691 | 12/1959 | De Prisco et al. | 318—118 |
| 2,995,689 | 8/1961 | Scarpa | 318—118 X |

MILTON O. HIRSHFIELD, *Primary Examiner.*

ORIS L. RADER, *Examiner.*

C. W. DAWSON, D. F. DUGGAN, *Assistant Examiners.*